(12) United States Patent
Favaretto

(10) Patent No.: US 12,491,945 B2
(45) Date of Patent: Dec. 9, 2025

(54) CAR PROVIDED WITH AN INTERNAL COMBUSTION ENGINE

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 277 days.

(21) Appl. No.: 18/454,889

(22) Filed: Aug. 24, 2023

(65) Prior Publication Data
US 2024/0067272 A1    Feb. 29, 2024

(30) Foreign Application Priority Data

Aug. 25, 2022   (IT) .................. 102022000017628

(51) Int. Cl.
| | | |
|---|---|---|
| *B62D 25/08* | (2006.01) | |
| *B60K 5/02* | (2006.01) | |
| *B62D 25/24* | (2006.01) | |
| *B62D 27/06* | (2006.01) | |
| *B62D 35/02* | (2006.01) | |

(52) U.S. Cl.
CPC ............. *B62D 25/082* (2013.01); *B60K 5/02* (2013.01); *B62D 25/24* (2013.01); *B62D 27/065* (2013.01); *B62D 35/02* (2013.01)

(58) Field of Classification Search
CPC .... B62D 25/082; B62D 25/24; B62D 25/105; B62D 25/12; B62D 27/065; B62D 35/02; B62D 35/007; B62D 29/04; B60K 5/02; F02B 75/20; B60R 13/0838; B60R 13/0861

See application file for complete search history.

(56) References Cited

U.S. PATENT DOCUMENTS 8,746,782 B2   6/2014  Naoi

FOREIGN PATENT DOCUMENTS

DE    102016005060 A1    9/2016

OTHER PUBLICATIONS

Anonymous: "VW Baja Bug: what is it and how to build one? The complete online guide", Dec. 6, 2019 (Dec. 6, 2019), XP093039822, Retrieved from the Internet: URL:https://www.aircooledcommunity.com/blog/vw-baja-bug/ [retrieved on Apr. 18, 2023].
Italian Search Report for Application No. 102022000017628, Filing Date: Aug. 25, 2022; Date of Mailing: Apr. 18, 2023, 8 pages.
Zurschmeide Jeff: "1998 Mercedes-Benz Clk Gtr Roadster—Sports Car Market", Sep. 19, 2015 (Sep. 19, 2015), XP093039816, Retrieved from the Internet:URL:https://www.sportscarmarket.com/profile/1998-mercedes-benz-clk-gtr-roadster [retrieved on Apr. 18, 2023].

*Primary Examiner* — Timothy Hannon
(74) *Attorney, Agent, or Firm* — CANTOR COLBURN LLP

(57) ABSTRACT

A car having: two front wheels; two rear wheels; an internal combustion engine, which is provided with a plurality of cylinders, where respective pistons slide on the inside, and with a crankshaft connected to the pistons; an engine compartment, where the internal combustion engine is arranged; and a bottom, which is the lowest part of the car and, in use, faces a road surface on which the car moves. The body has no openable hood allowing access to the engine compartment.

13 Claims, 28 Drawing Sheets

CAR PROVIDED WITH AN INTERNAL COMBUSTION ENGINE

CROSS-REFERENCE TO RELATED APPLICATIONS

This patent application claims priority from Italian patent application no. 102022000017628 filed on Aug. 25, 2022, the entire disclosure of which is incorporated herein by reference.

TECHNICAL FIELD

The invention relates to a car provided with an internal combustion engine.

PRIOR ART

In a car there is an engine compartment (which can be in a front position or in a central/rear position), where an internal combustion engine is located. In order to allow operators to access the internal combustion engine (for scheduled maintenances or, more rarely, for repairs), the engine compartment has an openable hood on top of it. Namely, by opening the hood, operators can access the internal combustion engine from above. However, access to the internal combustion engine from above is, in some areas, problematic since operators must always stand on the side relative to the outline of the car.

Furthermore, the body necessarily has to have a large-sized "hole" in the area of the engine compartment and said "hole" is normally closed by the hood, which is hinged to the body. The presence of this "hole" inevitably significantly reduces the overall stiffness of the structure of the car, since it interrupts the continuity of the body (the hood, for it is hinged to the rest of the body on one side and rests against the rest of the body on the other four sides, cannot be in any way a structural element); as a consequence, further structural elements must be present in order to make up for the weakening caused by the "hole" in the body in the area of the engine compartment, with an unavoidable mass increase.

In one car model, referred to as a "Baja Bug", the internal combustion engine is located in a rear position and is always exposed, namely is not surrounded by any cover.

In another car model, referred to as a "Mercedes-Benz CLK GTR Roadster", the internal combustion engine is located in a central position and is covered by a rear part of the body, which lacks an openable hood; as a consequence, in order to access the internal combustion engine, the rear part of the body necessarily has to be completely removed.

DESCRIPTION OF THE INVENTION

The object of the invention is to provide a car provided with an internal combustion engine, which is not affected by the drawbacks disclosed above, namely which allows (when necessary) ideal access to the internal combustion engine and, at the same time, ensures a mass reduction, given the same overall stiffness.

According to the invention, there is provided a car provided with an internal combustion engine as claimed in the appended claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein.

PREFERRED EMBODIMENTS OF THE INVENTION

Figure 1:
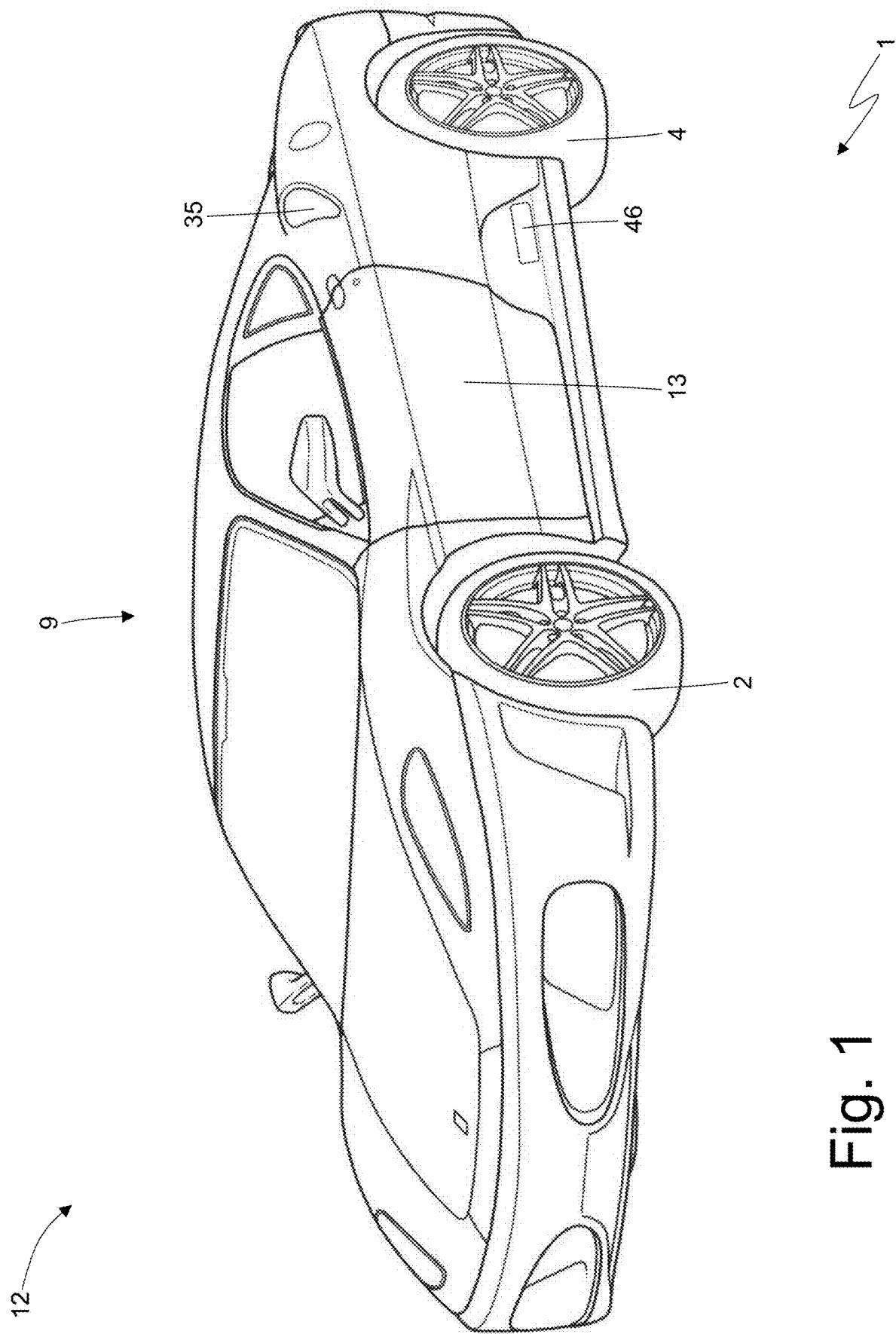
FIG. 1 is a perspective view of a car provided with an internal combustion engine.
Figure 4:
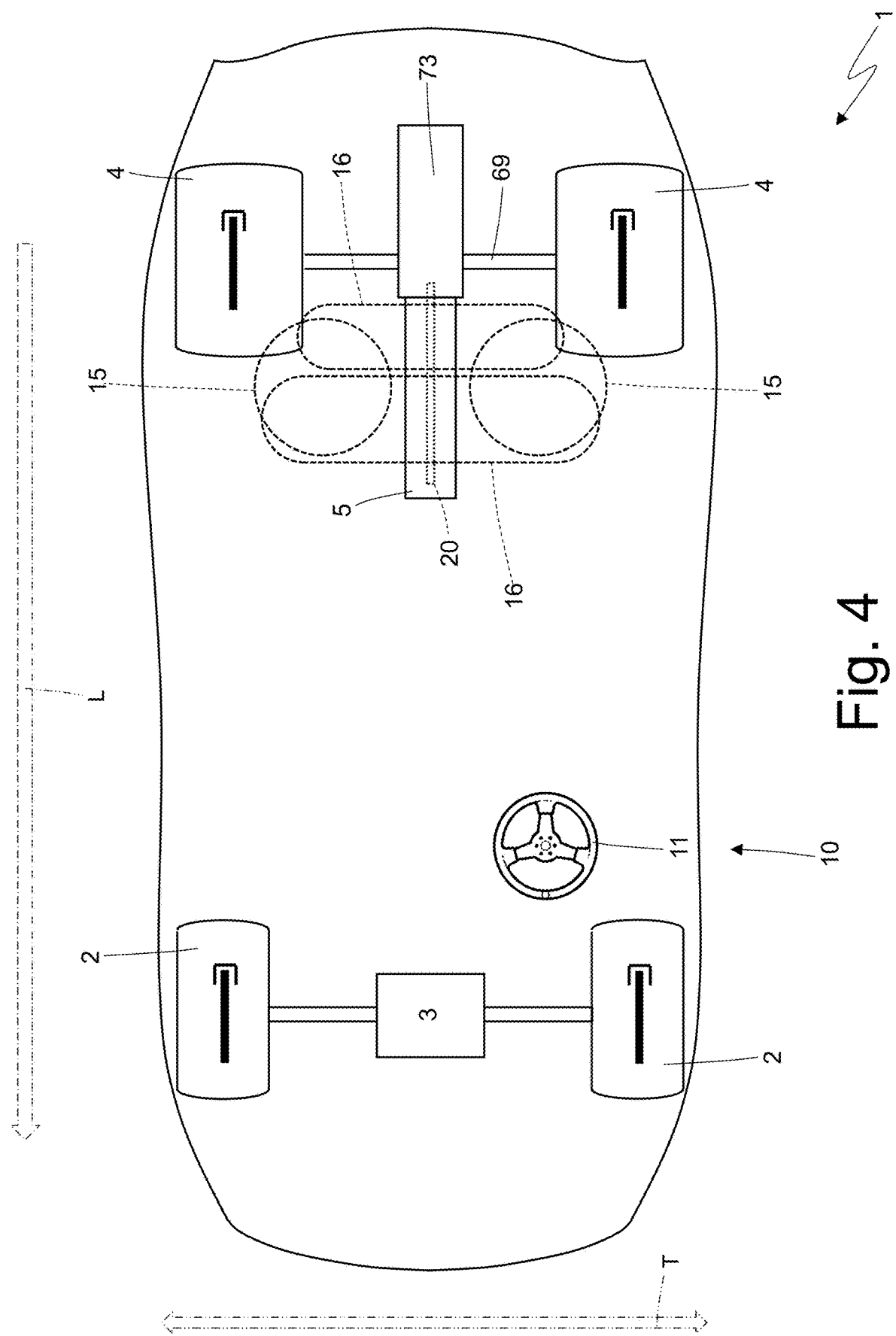
FIG. 4 is a schematic plan view of the car of FIG. 1.

In FIG. 1, number 1 indicates, as a whole, a hybrid car (namely, with a hybrid propulsion) provided with two front drive wheels 2, which receive a torque from (at least) an electric machine 3 (schematically shown in FIG. 4), and with two rear drive wheels 4, which receive a torque from an internal combustion engine 5 (schematically shown in FIG. 4).

Figure 15:
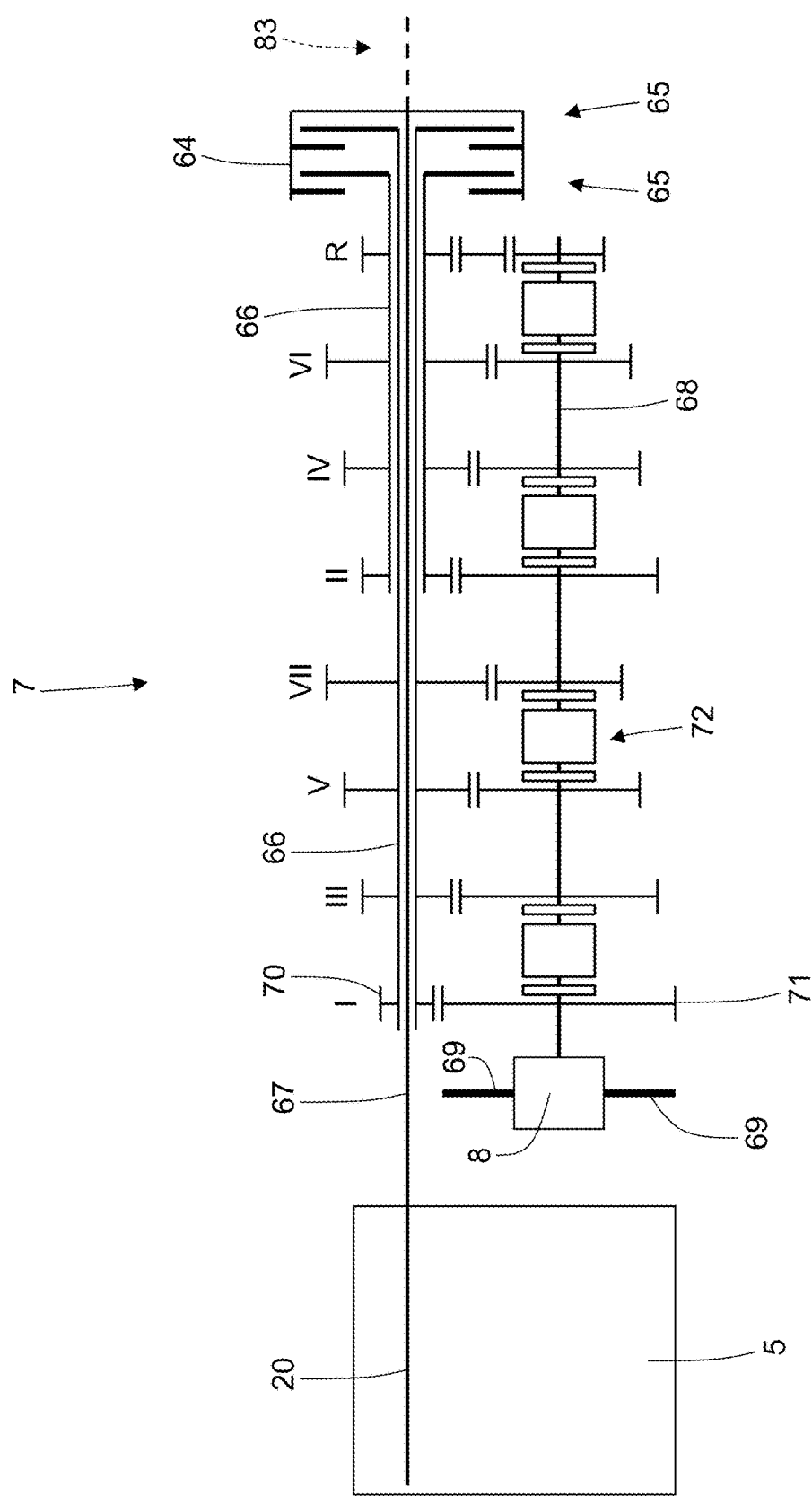
FIG. 15 is a schematic view of the drivetrain system of FIGS. 13 and 14.

According to FIG. 4, the electric machine 3 is connected to the two front drive wheels 2 by means of a drivetrain system (which is known and, hence, is not shown) provided with a front differential; similarly, the internal combustion engine 5 is connected to the two rear drive wheels 4 by means of a drivetrain system 6 provided with a gearbox 7 and with a rear differential 8 (schematically shown in FIG. 15).

The electric machine 3 preferably is a reversible machine (namely, it can work both as an electric motor, thus absorbing electrical energy and generating a mechanical torque, and as an electric generator, thus absorbing mechanical energy and generating electrical energy); according to other embodiments which are not shown herein, there is no electric machine 3.

Figure 2:
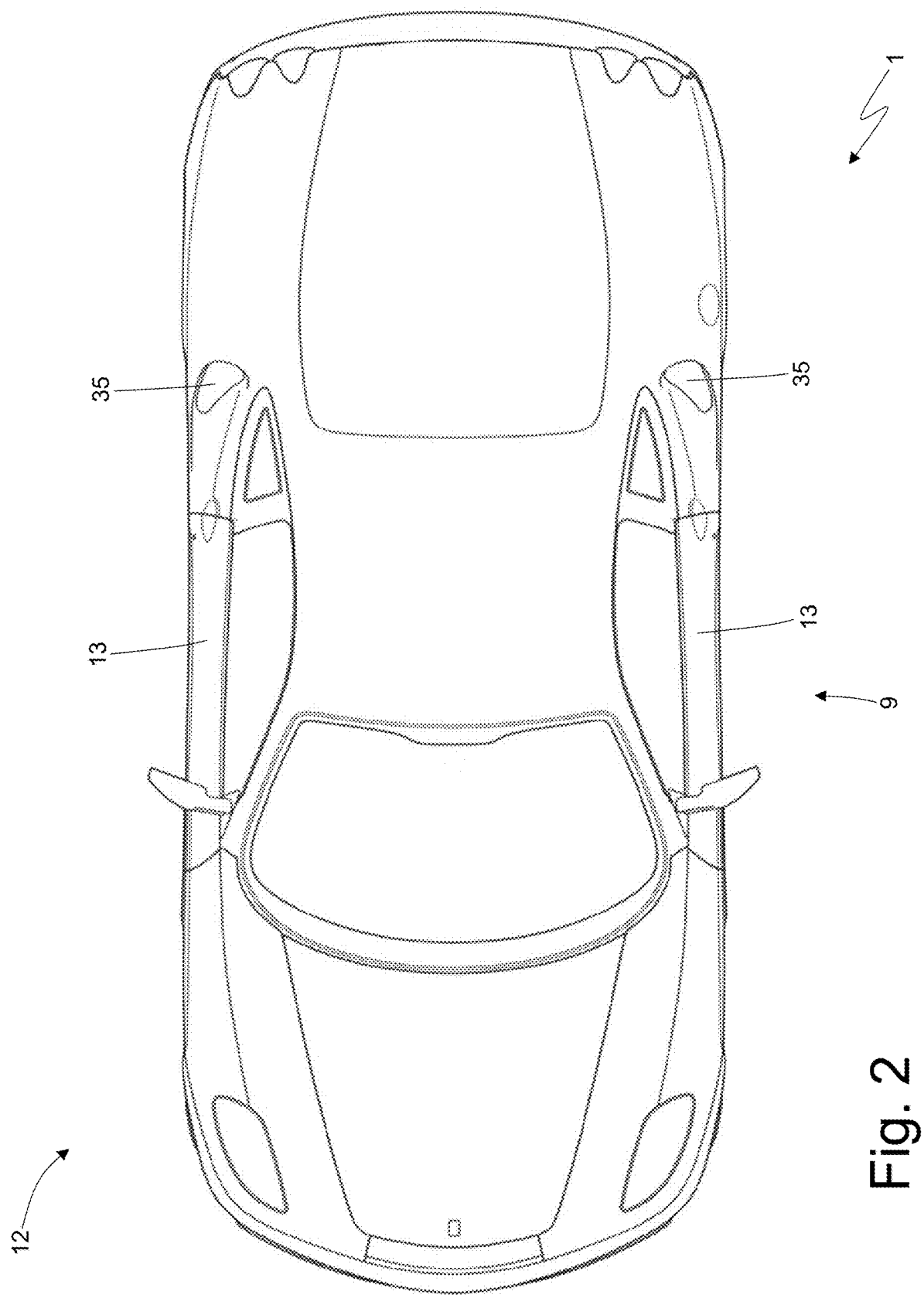
FIGS. 2 and 3 are a top view and a bottom view, respectively, of the car of FIG. 1.

According to FIGS. 1 and 2, the car 1 comprises a passenger compartment 9, which is arranged between the two front wheels 2 and the two rear wheels 4 and contains, on the inside, a cockpit 10 (schematically shown in FIG. 4), which is arranged on the left side (alternatively, it could also be arranged on the right side). According to FIG. 4, the cockpit 10 comprises a steering wheel 11, a driver's seat (not shown) and a series of controls (which are known and, hence, are not shown) that can be operated by the driver (such as, for example, an accelerator pedal, a brake pedal and at least one lever to select the gears).

According to FIGS. 1 and 2, the car 1 comprises a body 12, which delimits (among other things) the passenger compartment 9 and has two sides, where at least two doors 13 are obtained. The left door 13 allows direct access to the cockpit 10.

Figure 3:
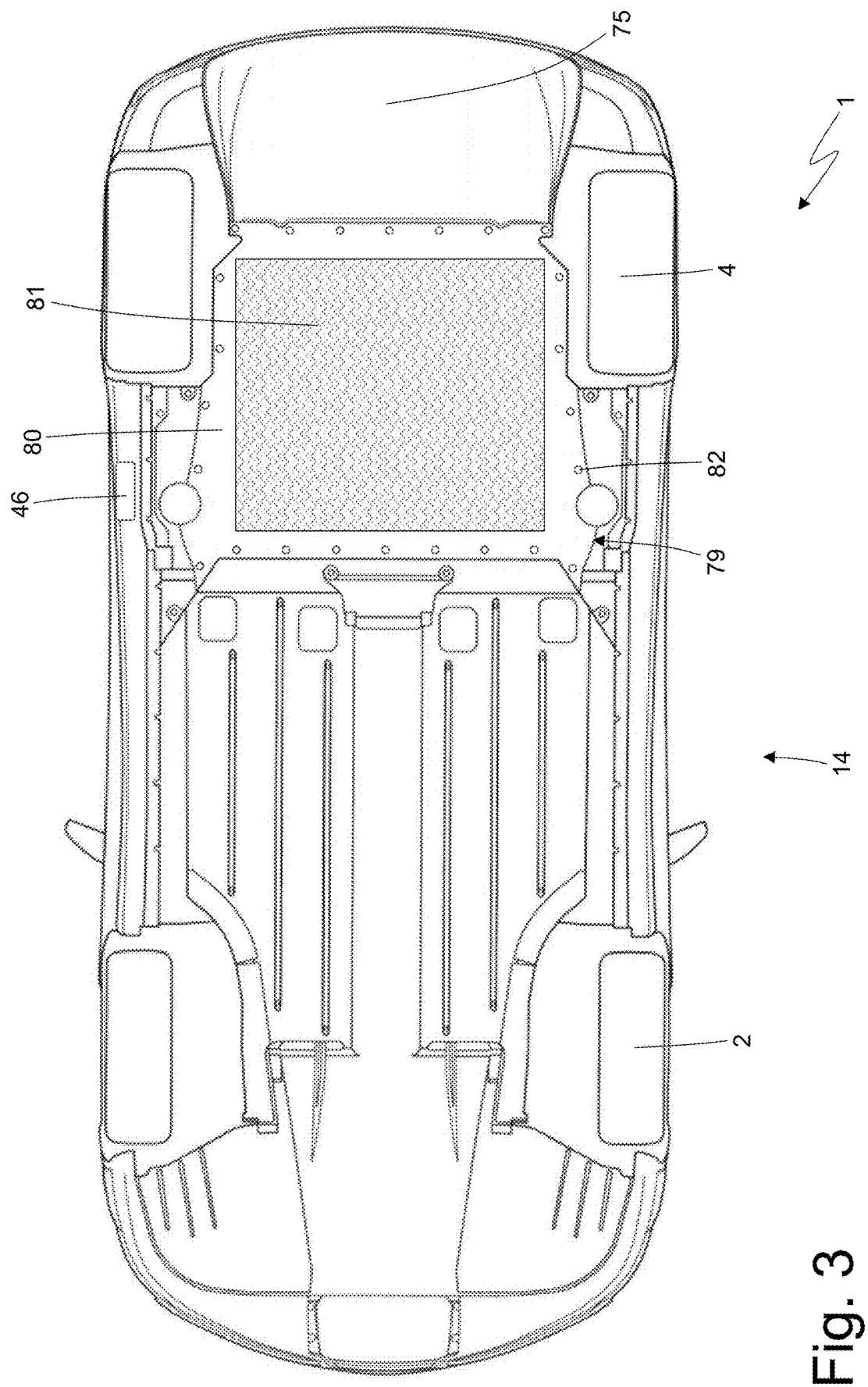

According to FIG. 3, the car 1 comprises a bottom 14, which is the lowest part of the car 1 and, in use, faces a road surface on which the car 1 moves.

According to a possible embodiment, the internal combustion engine 5 is supplied with hydrogen (or also another gaseous fuel). According to a different embodiment, the internal combustion engine 5 is supplied with petrol (or also another liquid fuel).

According to FIG. 4, the internal combustion engine is supplied with hydrogen, which is stored at a high pressure (for instance, with a maximum pressure of circa 700 bar) in four different tanks 15 and 16: two tanks 15 have a spherical shape and have the same size, whereas two tanks 16 have a cylindrical shape and have different sizes (namely, one tank 16 is larger than the other tank 16).

The two tanks 15 (with a spherical shape) are arranged besides an engine block of the internal combustion engine 5 on the two opposite sides of the internal combustion engine itself; namely, one tank 15 is arranged on the right of the engine block of the internal combustion engine 5, whereas the other tank 15 is arranged on the left of the engine block of the internal combustion engine 5. In other words, the two tanks 15 (with a spherical shape) are arranged at the same vertical height, are arranged in the same longitudinal position and are separate from one another crosswise (with the interposition of the internal combustion engine 5), i.e. are spaced apart from one another only crosswise.

The two tanks 16 (with a cylindrical shape) are arranged above the internal combustion engine 5 in front of one another. In other words, the two tanks 16 (with a cylindrical shape) are arranged (approximately) at the same vertical height, are arranged in the same transverse position and are longitudinally separate from one another, i.e. are spaced apart from one another only longitudinally (namely, one is arranged in front of the other). In particular, both tanks 16 (with a cylindrical shape) are oriented crosswise, i.e. their central symmetry axed are oriented crosswise. In the embodiment shown in FIG. 4, the tank 16 arranged in front (namely, closer to the front) is larger than the tank 16 arranged behind (namely closed to the back).

Figure 5:
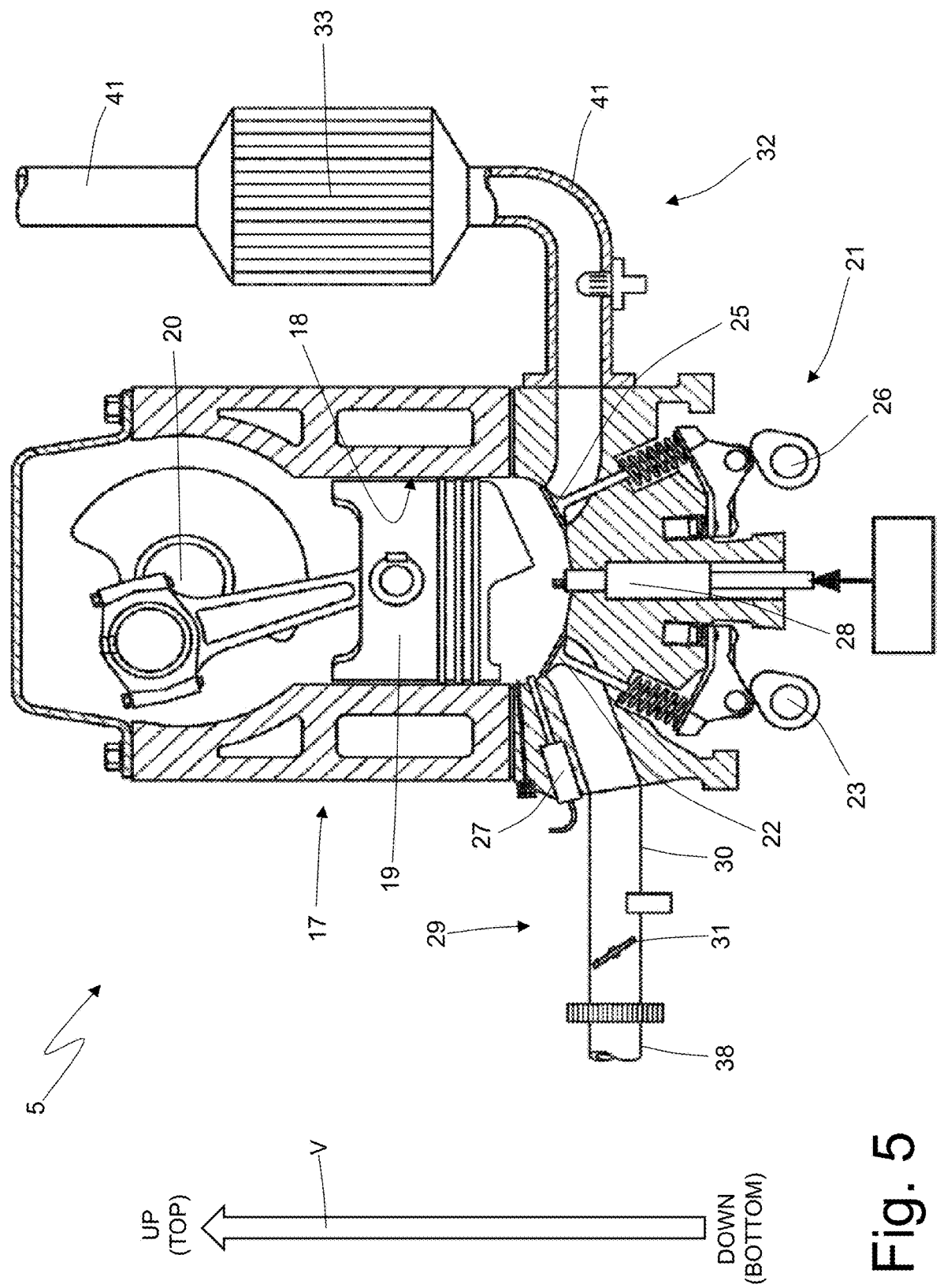
FIG. 5 is a schematic view of the internal combustion engine of the car of FIG. 1.

According to FIG. 5, the internal combustion engine comprises a crankcase 17, where a plurality of cylinders 18 are obtained (only one of them being shown in FIG. 5). Preferably (though not necessarily), the cylinders 18 are arranged in line, since this solution reduces the transverse dimensions of the internal combustion engine 5 and, hence, among other things, leaves more space for the tanks 15. In the embodiment shown in the accompanying figures there are six in-line cylinders 18, but the number and the arrangement of the cylinders 18 could obviously be different.

Each cylinder 18 has a respective combustion chamber and a respective piston 19 mechanically connected to a crankshaft 20 (by means of a respective connecting rod) so as to transmit the force generated by the combustion to the crankshaft 20. The crankcase 17 is coupled (connected) to a cylinder head 21, which constitutes the so-called crown of the cylinders 18 (namely, the top closing of the cylinders 18 with the so-called "flame deck"). In case of an in-line arrangement of the cylinders 18 there is one single cylinder head 21, whereas in case of a "V"-like arrangement of the cylinders 18 there are two twin cylinder heads 21 for the two banks of cylinders 18.

The assembly formed by the crankcase 17 and by the cylinder head 21 constitutes the engine block of the internal combustion engine 5.

In the embodiment shown in the accompanying figures, the internal combustion engine 5 is arranged (oriented) longitudinally, namely the crankshaft 20 is arranged (oriented) longitudinally, since this solution reduces the transverse dimensions of the internal combustion engine 5 and, hence, among other things, leaves more space for the tanks 15. According to other embodiments which are not shown herein, the internal combustion engine 5 is arranged (oriented) crosswise.

In the embodiment shown in the accompanying figures, the internal combustion engine 5 is arranged in a central or rear position, namely the internal combustion engine 5 is arranged behind the passenger compartment 9 and is located between the front wheels 2 and the rear wheels 4 (central arrangement, as shown in the accompanying figures) or is located past the rear wheels 4 (rear arrangement, not shown).

Each cylinder 18 comprises two intake valves 22 controlled by a camshaft 23, which receives the motion from the crankshaft 20 by means of a belt transmission 24 (shown in FIG. 26); alternatively to the belt transmission 24, a chain transmission or a gear transmission could be used. Furthermore, each cylinder 18 comprises two exhaust valves controlled by a camshaft 26, which receives the motion from the crankshaft 20 by means of the belt transmission 24 (shown in FIG. 26). The intake valves 22, the exhaust valves 25 and the corresponding control means (namely, the return springs and the camshafts 23 and 26) are accommodated in the cylinder head 21.

Each cylinder 18 further comprises (at least) a fuel injector 27, which cyclically injects fuel into the cylinder 18; FIG. 5 shows a direct injection of fuel into the cylinder 18, but the injection of fuel into the cylinder 18 could also be (partially or completely) indirect. Each cylinder 18 comprises (at least) a spark plug 28, which is cyclically activated to cause the ignition of the mixture of air (oxidizer) and fuel present in the combustion chamber at the end of the compression stroke.

According to the accompanying figures, the internal combustion engine 5 is vertically oriented with the crankshaft 20 arranged higher than the cylinders 18. In other words, the internal combustion engine 5 is arranged "upside-down" relative to the traditional arrangement entailing the cylinders 18 arranged at the top and the crankshaft 20 arranged at the bottom. As a consequence, the cylinder head 21, which constitutes the crown of the cylinders 18, is arranged under the crankcase 17 and is the lowest part of the internal combustion engine 5.

The internal combustion engine 5 comprises an intake system 29, which sucks air from the outside in order to convey it into the cylinders 18 (the intake of air into the cylinders 18 is adjusted by the intake valves 22). Among other things, the intake system 29 comprises an intake manifold 30, which is directly connected to all cylinders 18; the intake of air into the intake manifold 30 is adjusted by a throttle valve 31.

The internal combustion engine 5 comprises an exhaust system 32, which releases the exhaust gases coming from the cylinders 18 into the atmosphere. Among other things, the exhaust system 32 comprises (at least) an exhaust gas treatment device 33 (typically, a catalytic converter).

According to FIGS. 9-12, the intake system 29 comprises two separate twin intake ducts 34, which are arranged on the two sides of the car 1 (namely, an intake duct 34 is arranged on the right side and the other intake duct 34 is arranged on the left side), and originates from respective air intakes 35 obtained through the body 12. Along each intake duct 34 and close to the respective air intake there is an air filter 36. Each intake duct 34 ends in a compressor assembly 37, which increases air pressure in order to increase the volumetric efficiency of the cylinders 18. One (single) intake duct 38 originates from the compressor assembly 37 and ends in the intake manifold 30 after having crossed two intercoolers 39 and 40 arranged in series. Namely, an initial segment of the intake duct 38 connects the compressor assembly 37 to the intercooler 39, then an intermediate segment of the intake duct 38 connects the intercooler 39 to the intercooler 40 and, finally, an end segment of the intake duct 38 connects the intercooler 40 to the intake manifold 30.

According to a preferred embodiment, the intercooler 39 is an air/air intercooler and the intercooler 40 is an air/air intercooler as well. According to a preferred embodiment, the intercooler 39 has volume that is larger than a volume of the intercooler 40; to this regard, it should be pointed out that the intercooler 39 is at a disadvantage relative to the intercooler 40, since it is arranged farther from the corresponding air intake and makes up for this disadvantage both with a larger volume and by having to cool air having a higher intake temperature (since the intercooler 39 directly receives air from the compressor assembly 37, whereas the intercooler 40, for it is arranged in series to the intercooler 39, receives air that was already partially cooled by the intercooler 39).

According to FIGS. 9-12, the exhaust system 32 comprises two separate twin exhaust ducts 41, which receive exhaust gases from respective cylinders 18, to which they are singularly connected; in particular, each exhaust duct 41 is connected to three cylinders 18 by means of respective channels, which originate from the three cylinders 18 and end in an inlet of the exhaust duct 41 (from another point of view, each exhaust duct 41 is initially divided into three parts so that it can be connected to the respective three cylinders 18). Along each exhaust duct 41 there is a corresponding exhaust gas treatment device 33 (typically, a catalytic converter); therefore, the exhaust system 32 as a whole comprises two separate twin exhaust gas treatment devices 33.

Along the exhaust ducts 41 there is a turbine assembly 42 provided with two twin turbines 43 (which are better shown in FIG. 17), each coupled to a corresponding exhaust duct 41. Namely, each exhaust duct 41 goes through a respective turbine 43 and the two turbines 43 are arranged side by side so as to form the turbine assembly 42. In other words, there is a turbine 43, which is arranged along each exhaust duct 41 and is located beside the engine block (consisting of the crankcase 17 and of the cylinder head 21) of the internal combustion engine 5.

The two exhaust ducts 41 end in one single common silencer 44, which receives exhaust gases from both exhaust ducts 41. According to other embodiments which are not shown herein, two separate twin silencers 44 are provided, each receiving exhaust gases only from a respective exhaust duct 41.

In the preferred embodiment shown in the accompanying figures, the silencer 44 has one single exhaust gas end pipe 45, which leads to an outlet opening 46; according to other embodiments which are not shown herein, the silencer 44 has two or more end pipes 45, each leading to a corresponding outlet pipe 46.

Figure 16:
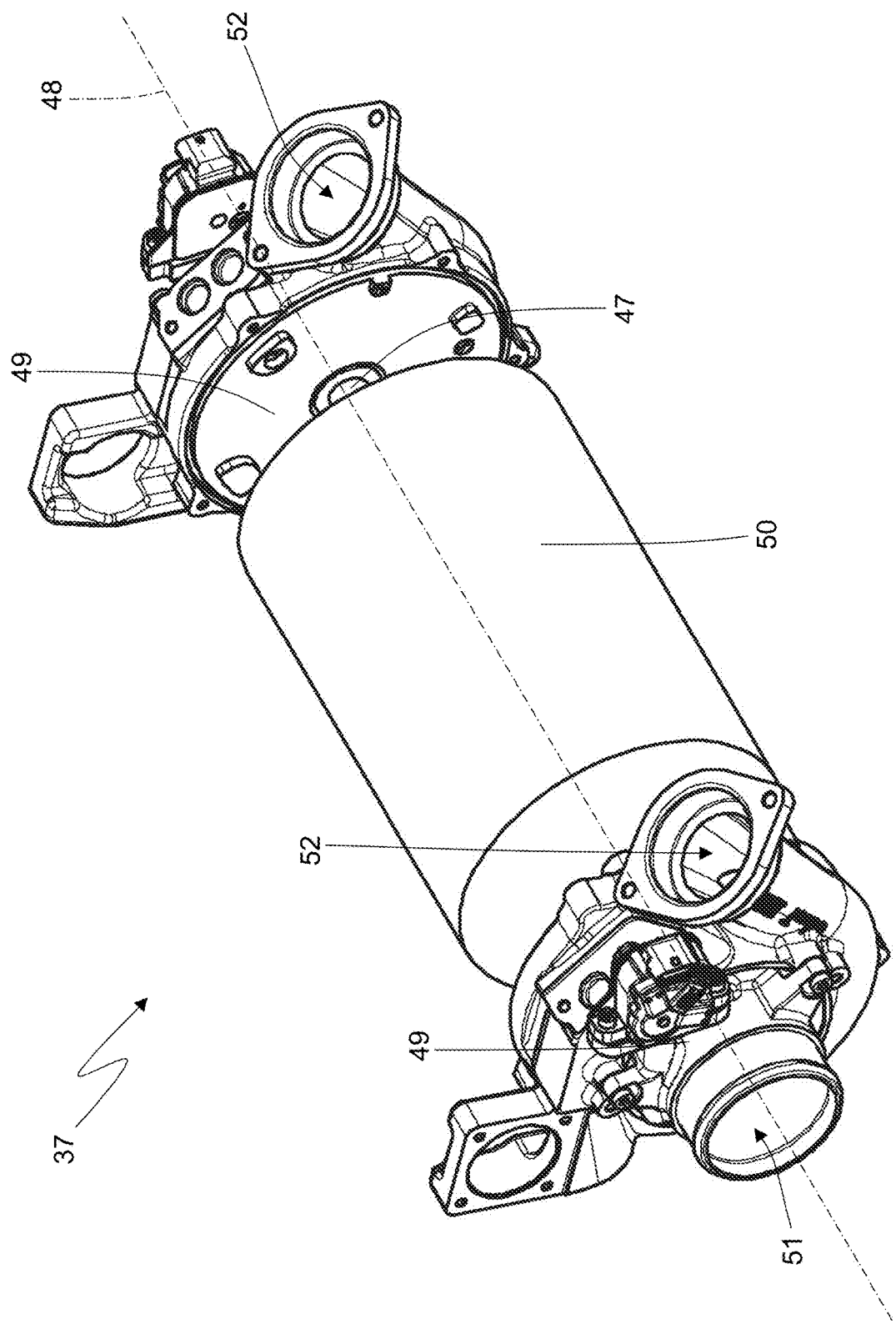
FIG. 16 is a perspective view of a compressor assembly of the internal combustion engine of the car of FIG. 1.

According to FIG. 16, the compressor assembly 37 (which is designed to be used in the supercharged internal combustion engine 5) comprises one single shaft 47, which is mounted so as to rotate around a rotation axis 48. In the embodiment shown in the accompanying figures, the shaft 47 (hence, the rotation axis 48) is oriented crosswise; according to a different embodiment which is not shown herein, the shaft 47 (hence, the rotation axis 48) is longitudinally oriented or is inclined (not parallel) both relative to the transverse direction and relative to the transverse direction.

The compressor assembly 37 comprises two (identical) twin compressors 49, each integral to the shaft 47 so as to rotate together with the shaft 47 and configured to compress air to be taken in by the supercharged internal combustion engine 5; in particular, each compressor 49 receives air from a respective intake duct 34 (namely, each intake duct 34 ends in a corresponding compressor 49).

The compressor assembly 37 comprises one single common electric motor 50, which is integral to the shaft 47 so as to cause the rotation of the shaft 47 (and, hence, cause the rotation of both the compressors 49 mounted on the shaft 47). In the embodiment shown in the accompanying figures, the electric motor 50 is arranged between the two compressors 49 and is perfectly equally spaced apart from the two compressors 49; according to a different embodiment which is not shown herein, the electric motor 50 is arranged on a side relative to both compressors 49 (namely, is closer to one compressor 49 and is farther from the other compressor 49).

As mentioned above, the two compressors 49 are identical and are centrifugal compressors. In particular, each compressor 49 comprises an axial inlet 51, which is arranged on the side opposite the shaft 47 and is connected to a respective intake duct 34, and a radial outlet 52. According to a preferred embodiment, the compressor assembly 37 comprises a joining duct 53 (shown in FIGS. 9-12), which is connected to both outlets 52 of the two compressors 49 so as to receive and join the air compressed by both compressors 49; the joining duct 53 ends in the intake duct 38, namely the intake duct 38 starts from the joining duct 53 to receive and join the air compressed by both compressors 49.

In the embodiment shown in the accompanying figures, the joining duct 53 is oriented crosswise; according to a different embodiment which is not shown herein, the joining duct 53 is longitudinally oriented or is inclined (not parallel) both relative to the transverse direction and relative to the transverse direction.

In the embodiment shown in the accompanying figures, the joining duct 53 is oriented parallel to the shaft 47 (hence, to the rotation axis 48); according to a different embodiment which is not shown herein, the joining duct 53 is not oriented parallel to the shaft 47 (hence, to the rotation axis 48).

Figure 17:
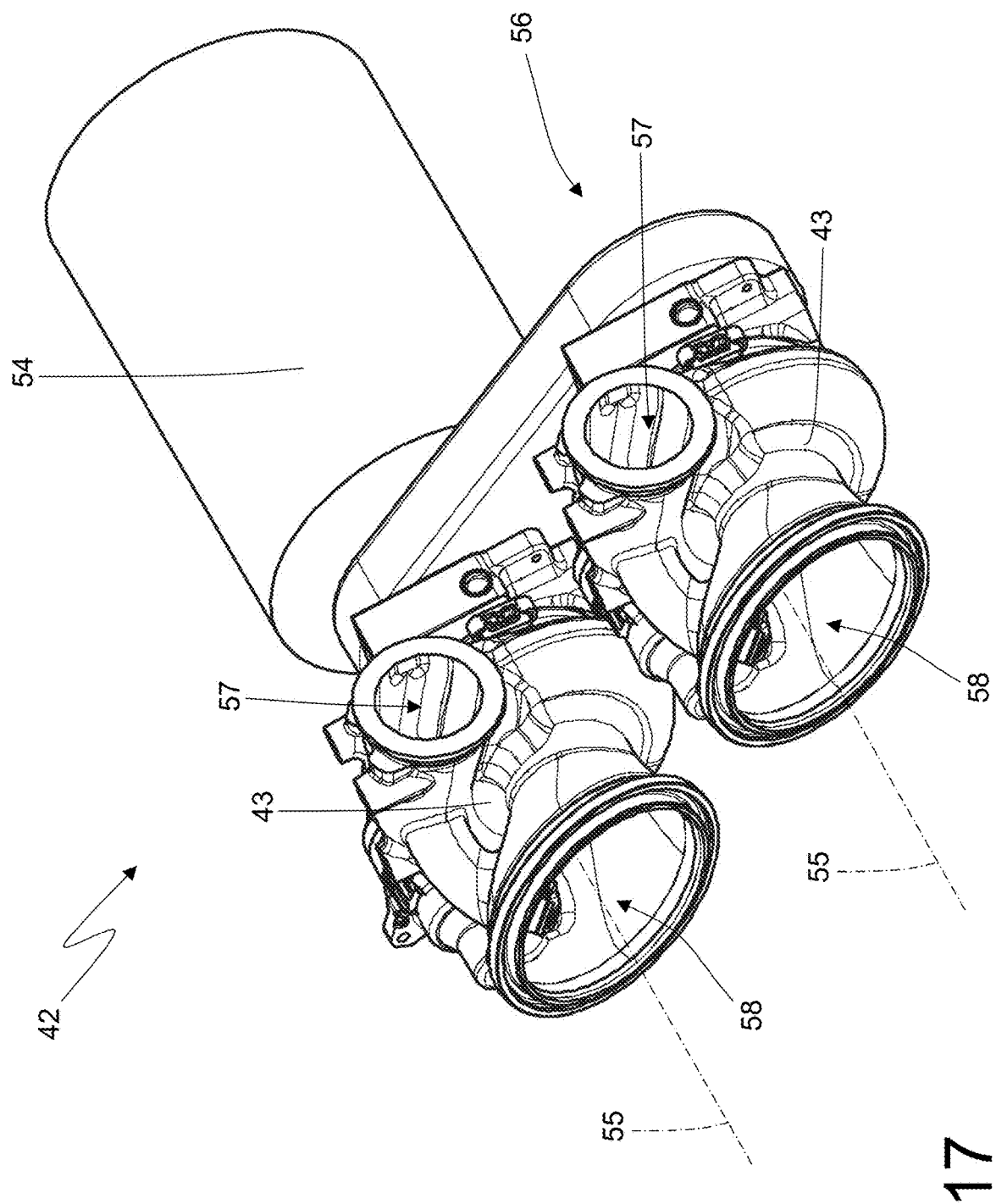
FIG. 17 is a perspective view of a turbine assembly of the internal combustion engine of the car of FIG. 1.
Figure 18:
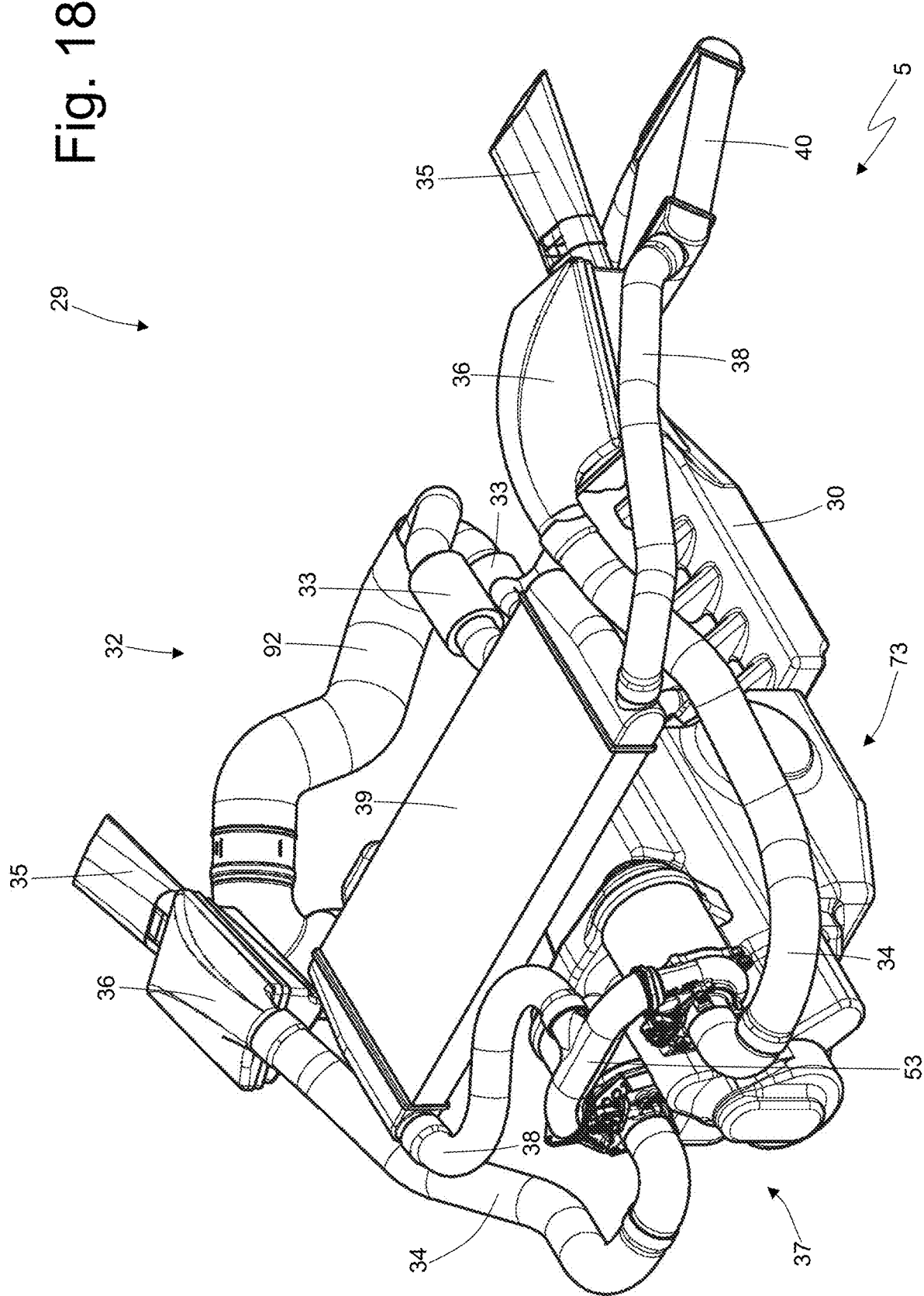
FIGS. 18-21 respectively are two different perspective views, namely a top view and a bottom view, of an alternative embodiment of the internal combustion engine.
Figure 19:
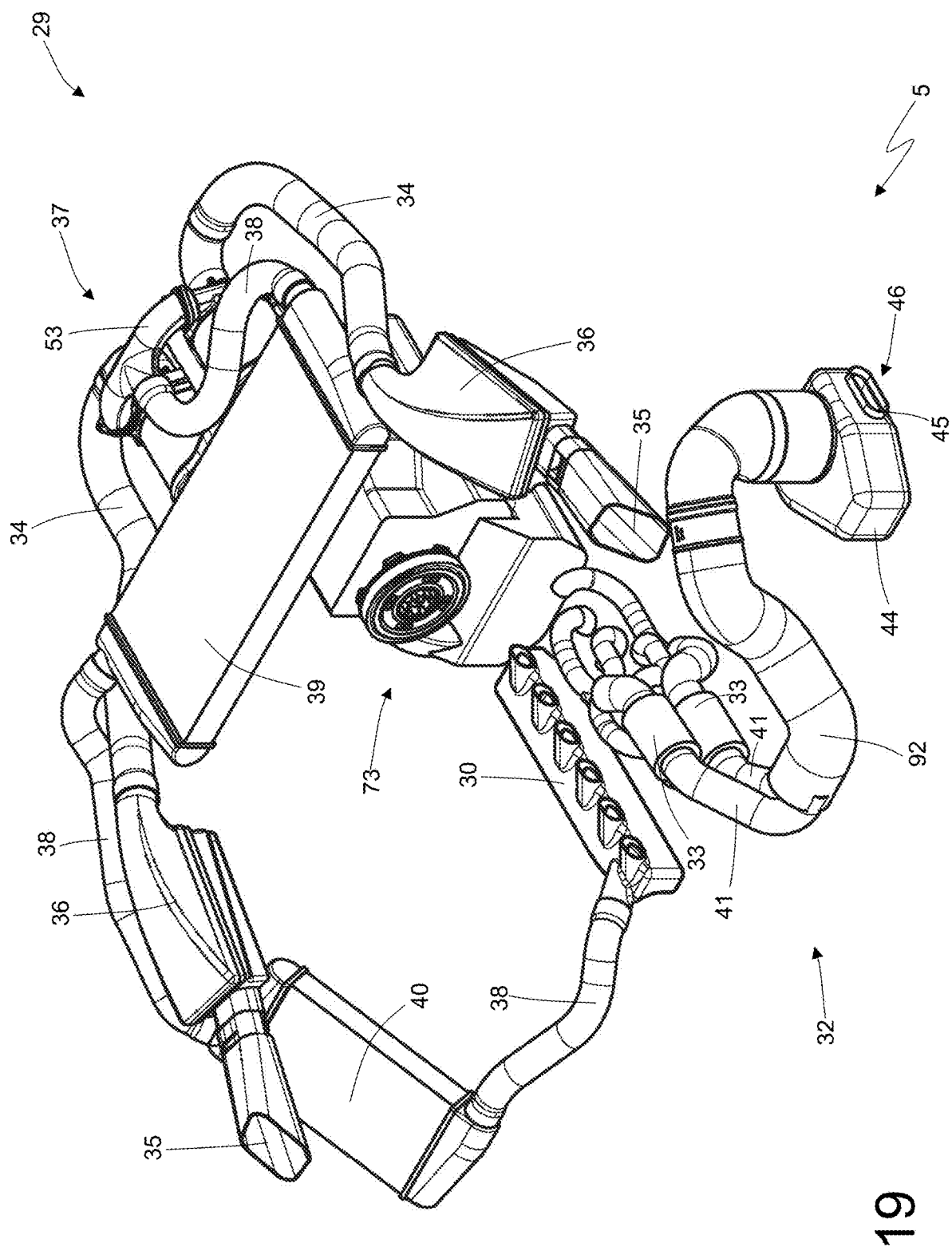
Figure 20:
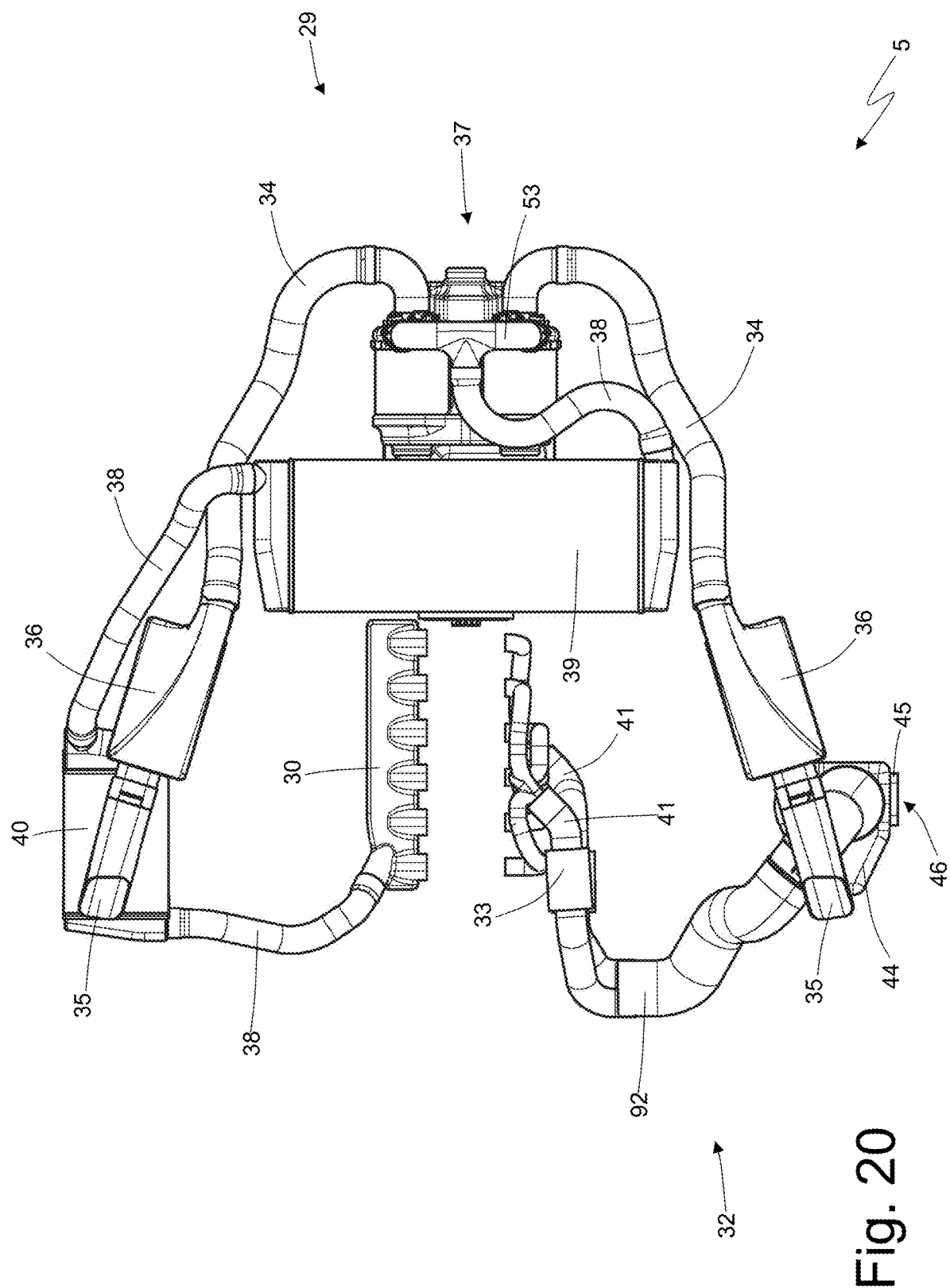
Figure 21:
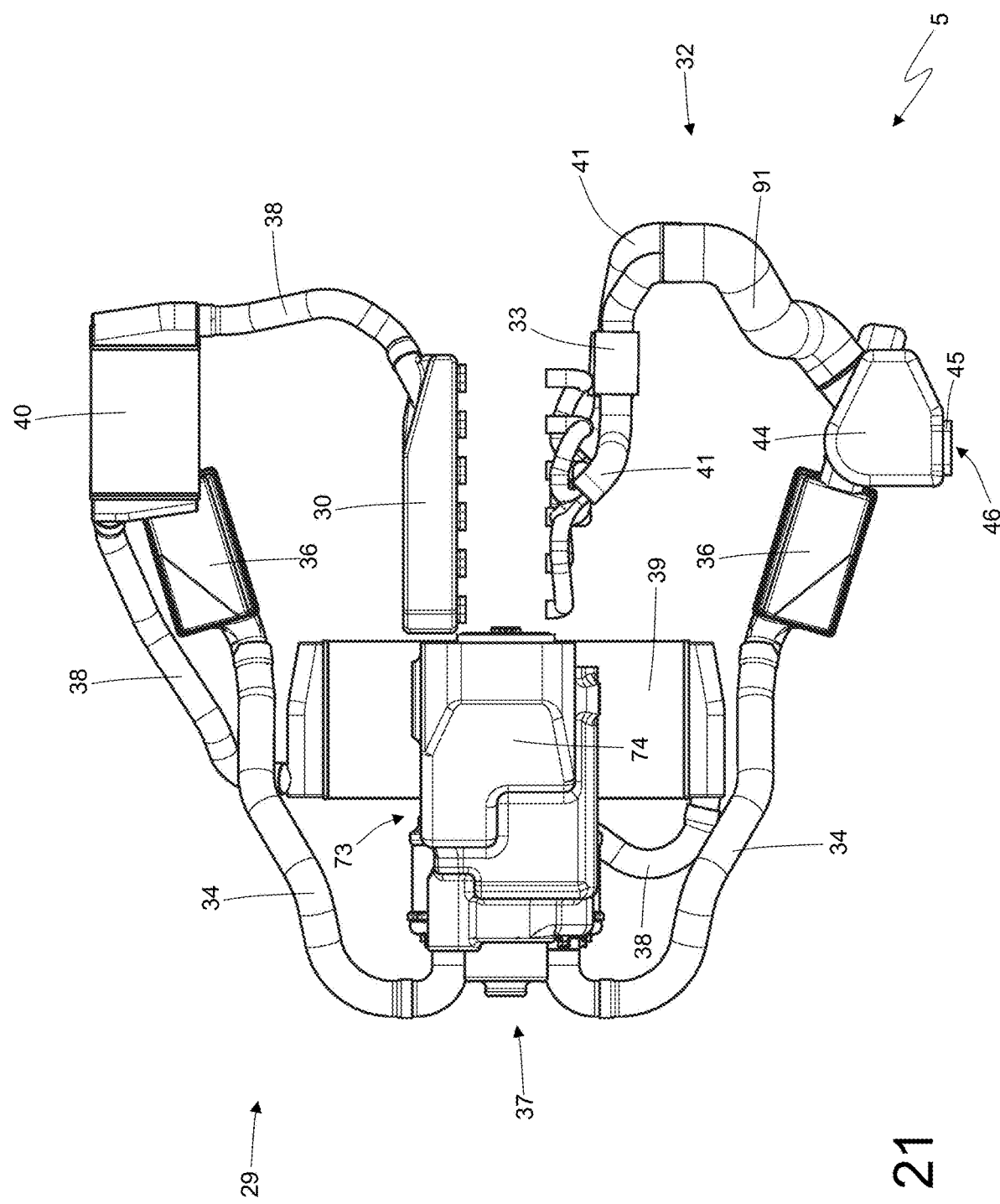

According to FIG. 17, the turbine assembly 42 comprises two (identical) twin turbines 43, which operate a same electric generator 54 together. In particular, the two turbines 43 are arranged side by side and have two respective rotation axes 55, which are parallel to and spaced apart from one another. The turbine assembly 42 comprises a transmission device 56, which connects both turbines 43 to the same electric generator 54. The transmission device 56 comprises two gear wheels, each integral to the shaft of a corresponding turbine 43 so as to receive the rotary motion from the turbine 43, and a connection element (a toothed belt, a chain, a gear train), which connects the two gear wheels to one another so as to cause both gear wheels to rotate together and at the same rotation speed. According to a possible embodiment, one gear wheel of the two gear wheels of the transmission device 56 is directly constrained to a shaft of the electric generator 54 so that the electric generator 54 rotates at the same rotation speed as the two turbines 43; alternatively, one gear wheel of the two gear wheels of the transmission device 56 is connected to the shaft of the electric generator 54 through the interposition of a speed reducer (typically with gears) so that the electric generator 54 rotates at a rotation speed which is smaller than the rotation speed of the two turbines 43.

According to a preferred embodiment shown in the accompanying figures, the electric generator 54 is coaxial to a turbine 43; namely, one turbine 43 and the electric generator 54 rotate around the same first rotation axis 55, whereas the other turbine 43 rotates around a second rotation axis 55, which is parallel to and spaced apart from the first rotation axis 55.

The two turbines 43 are identical and are centrifugal turbines. In particular, each turbine 43 comprises a radial inlet 57 connected to a side of the respective exhaust duct 41 and an axial outlet 52 arranged on the side opposite the transmission device 56 and connected to another side (leading to the silencer 44) of the respective exhaust duct 41.

Figure 11:
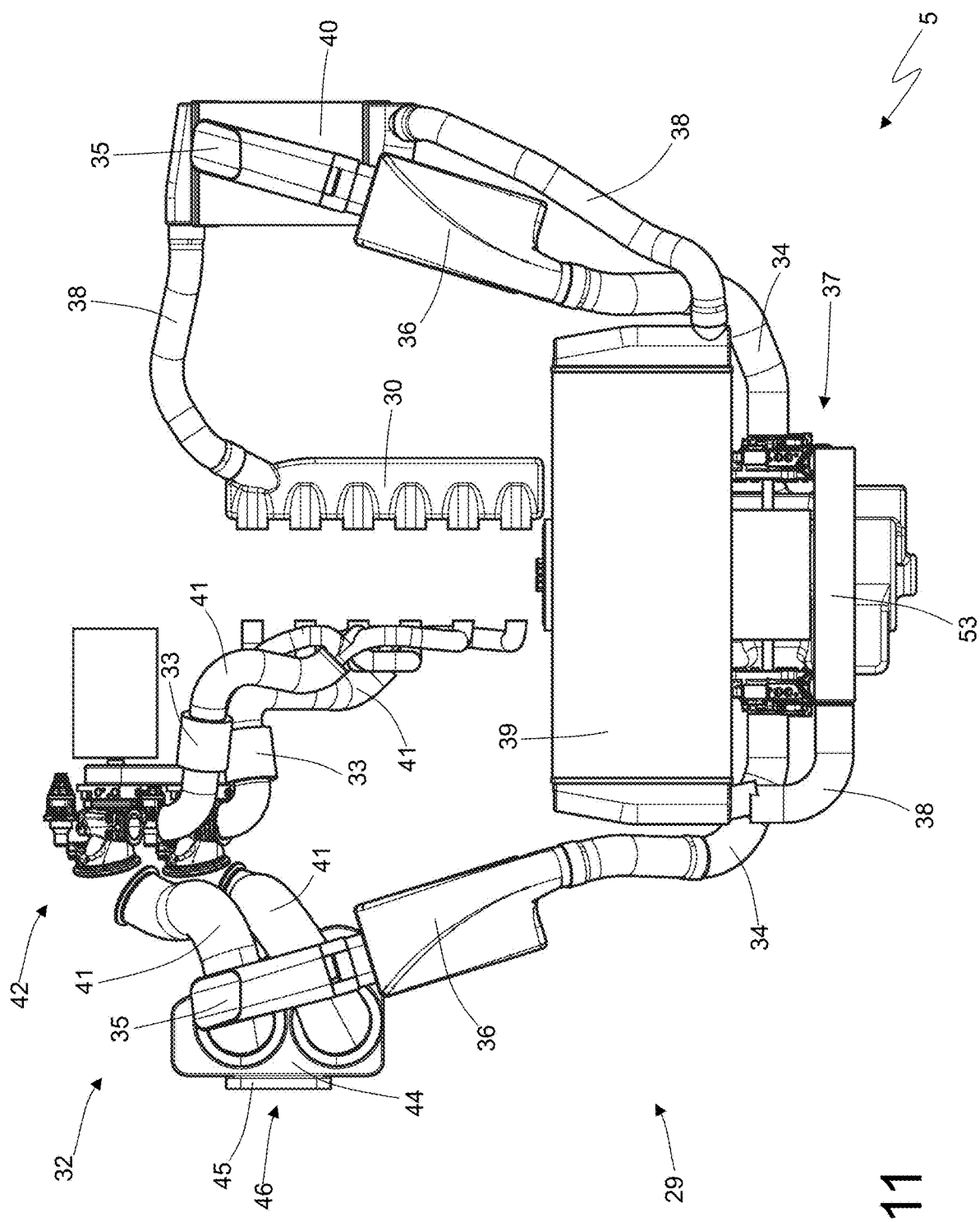
Figure 12:
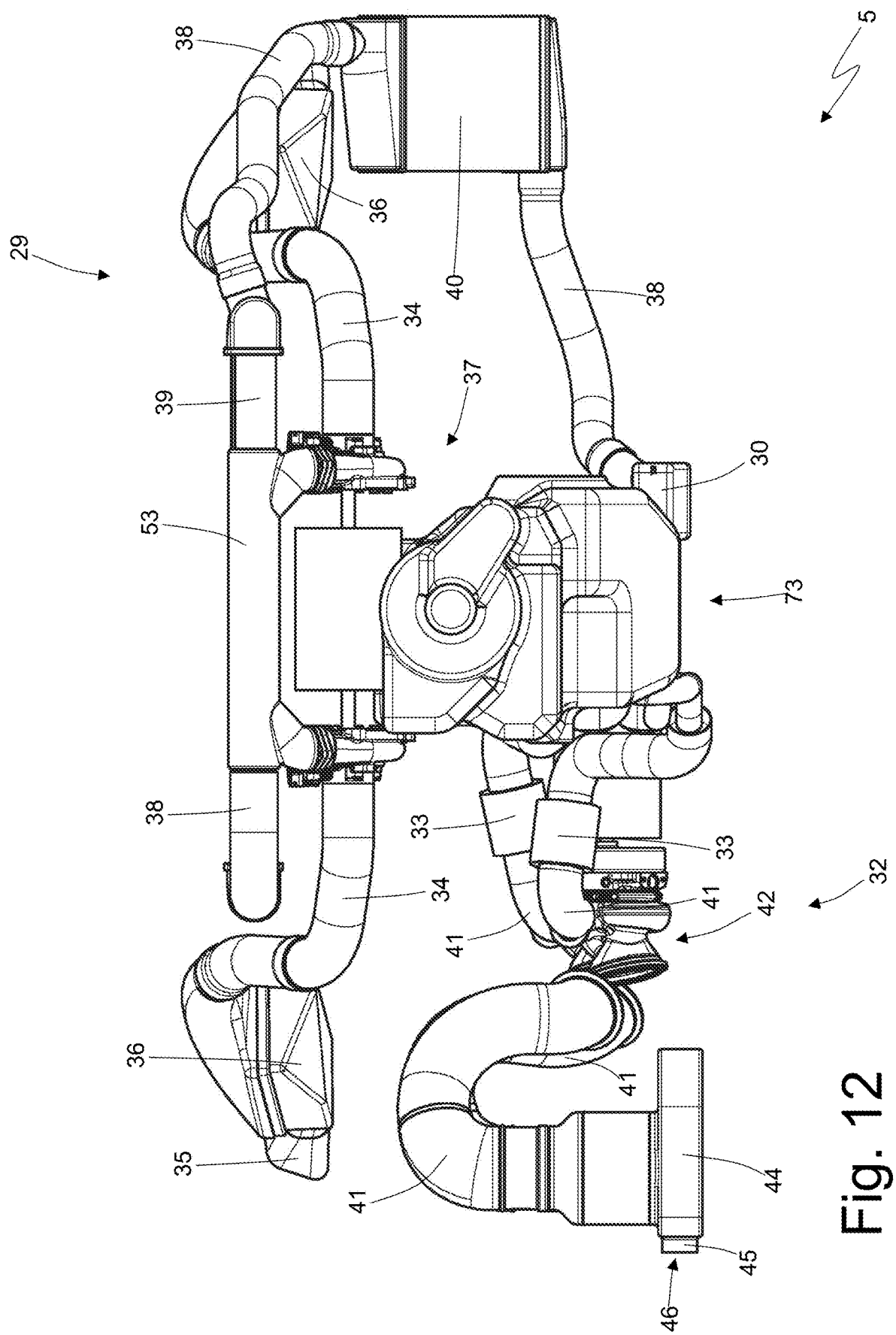

According to a preferred embodiment which is better shown in FIGS. 11 and 12, the silencer 41 is arranged beside an engine block (consisting of the crankcase 17 and of the cylinder head 21) of the internal combustion engine (on the side of the exhaust valves 25). The outlet opening 46 of the silencer 41 is obtained through a side of the car 1 (as shown in FIG. 1) or, according to an alternative embodiment, through the bottom 14 of the car 1 (as shown in FIG. 3).

In other words, the outlet opening 46 of the silencer 44 is arranged in an asymmetrical manner in the area of one single side of the car 1 and is located between a rear wheel 4 and a door 13. According to a preferred embodiment, the outlet opening 46 of the silencer 44 is arranged on the side where the cockpit 16 is located; in this way, the driver sitting in the cockpit 16 is close to the outlet opening 46 of the silencer 44 and, hence, is in the best position to perceive in an ideal manner the noise generated through the outlet opening 46 of the silencer 44.

In the embodiment shown in FIG. 1, the outlet opening 46 of the silencer 44 is obtained through a side of the body 12, whereas, in the alternative embodiment shown in FIG. 3, the outlet opening 46 of the silencer 44 is obtained through the bottom 14.

In the embodiment shown in the accompanying figures, the silencer 44 comprises one single outlet opening 46; according to other embodiments which are not shown herein, the silencer 44 comprises several outlet openings 46, which can be arranged more or less side by side (if necessary, one outlet opening 46 of the silencer 44 can be obtained through a side of the body 12, whereas the other outlet opening 46 of the silencer 44 is obtained through the bottom 14).

According to a preferred embodiment which is better shown in FIGS. 11 and 12, the silencer 44 is arranged on a side of the car 1 beside an engine block (consisting of the crankcase 17 and of the cylinder head 21) of the internal combustion engine 5 and in front of a rear drive wheel 4.

According to a preferred embodiment which is better shown in FIGS. 11 and 12, the turbine assembly 42 is arranged beside an engine block (consisting of the crankcase 17 and of the cylinder head 21) of the internal combustion engine 5 (on the side of the exhaust valves 25). In particular, the turbine assembly 42 is arranged between the internal combustion engine 5 (namely, between the engine block consisting of the crankcase 17 and of the cylinder head 21) and the silencer 44; in this way, the exhaust ducts 41 are particularly short and relatively scarcely winding.

In the embodiment shown in FIGS. 9-12, the compressor assembly 37 (comprising the two twin compressors 49) is connected between the two intake ducts 34 and 38, is located behind the engine block (consisting of the crankcase 17 and of the cylinder head 21) of the internal combustion engine 5, is arranged higher than the engine block of the internal combustion engine 5 and is operated by the electric motor 50.

As better shown in FIGS. 9-12, the compressor assembly 37 (comprising the two twin compressors 49) is arranged behind the intercooler 39 (namely, the two compressors 49 of the compressor assembly 37 are arranged at the back of the intercooler 39). The intercooler 39 is horizontally oriented and is arranged behind (at the back of) the engine block (consisting of the crankcase 17 and of the cylinder head 21) of the internal combustion engine 5; in particular, the intercooler 39 is arranged higher than the engine block of the internal combustion engine 5 and is located behind the engine block of the internal combustion engine 5. On the other hand, the intercooler 40 (connected in series to the intercooler 39 along the intake duct 38) is arranged on a side of the car 1 beside the engine block (consisting of the crankcase 17 and of the cylinder head 21) of the internal combustion engine 5 and in front of a rear drive wheel 4. In particular, the intercooler 40 is arranged on a side of the car 1 opposite the silencer 44; namely, the intercooler 40 and the silencer 44 are arranged on opposite sides of the car 1 separated from one another by the engine block (consisting of the crankcase 17 and of the cylinder head 21) of the internal combustion engine 5. In other words, the intercooler 40 and the silencer 44 are arranged on the opposite sides of the engine block of the internal combustion engine 5.

Figure 28:
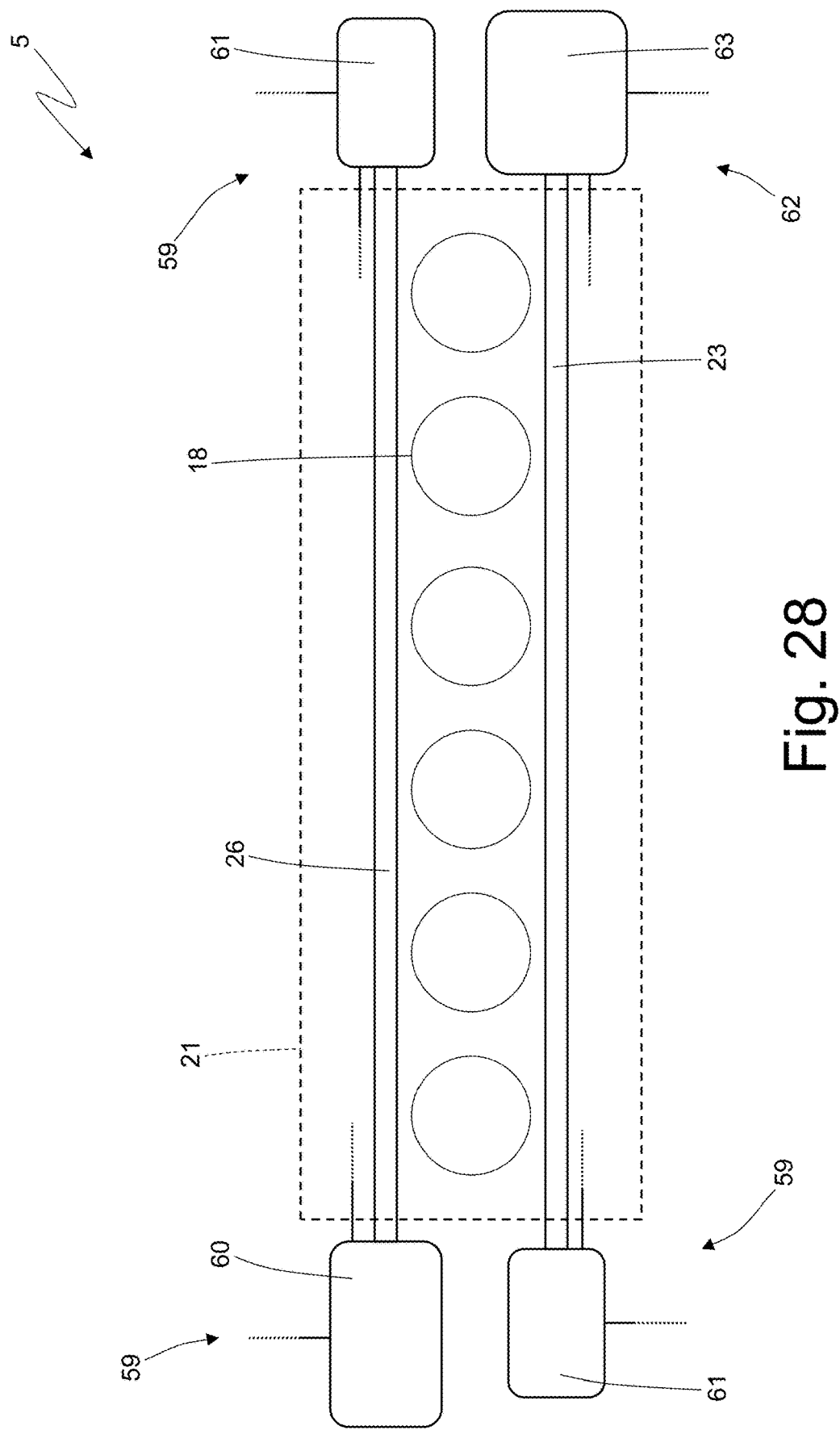

According to FIG. 28, the internal combustion engine comprises a dry-sump lubrication circuit 59, which causes lubricating oil to flow in all moving parts of the internal combustion engine 5. The lubrication circuit 59 comprises a lubrication delivery pump 60 configured to have lubricating oil flow; namely, the lubrication delivery pump 60 retrieves lubricating oil from an oil tank in order to feed said lubricating oil into the engine block (consisting of the crankcase 17 and of the cylinder head 21). The lubrication circuit 59 comprises two lubrication recovery pumps 61 configured to have lubricating oil flow; namely, each recovery pump 61 retrieves oil from the engine block (consisting of the crankcase 17 and of the cylinder head 21) and, in particular, from the lowest part of the engine block, thus from the cylinder head 21, in order to feed said lubricating oil into the tank (which is arranged higher than the cylinder head 21).

According to a preferred embodiment, the two recovery lubrication pumps 61 are arranged on opposite sides of the cylinder head 21, so as to retrieve lubricating oil in opposite areas of the cylinder head 21.

According to FIG. 28, the internal combustion engine comprises a cooling circuit 62, which causes a cooling liquid (for example, a mixture of water and glycol) to flow in the engine block (consisting of the crankcase 17 and of the cylinder head 21) of the internal combustion engine 5. The cooling circuit 62 comprises a cooling pump 63 configured to have the cooling liquid flow.

Figure 27:
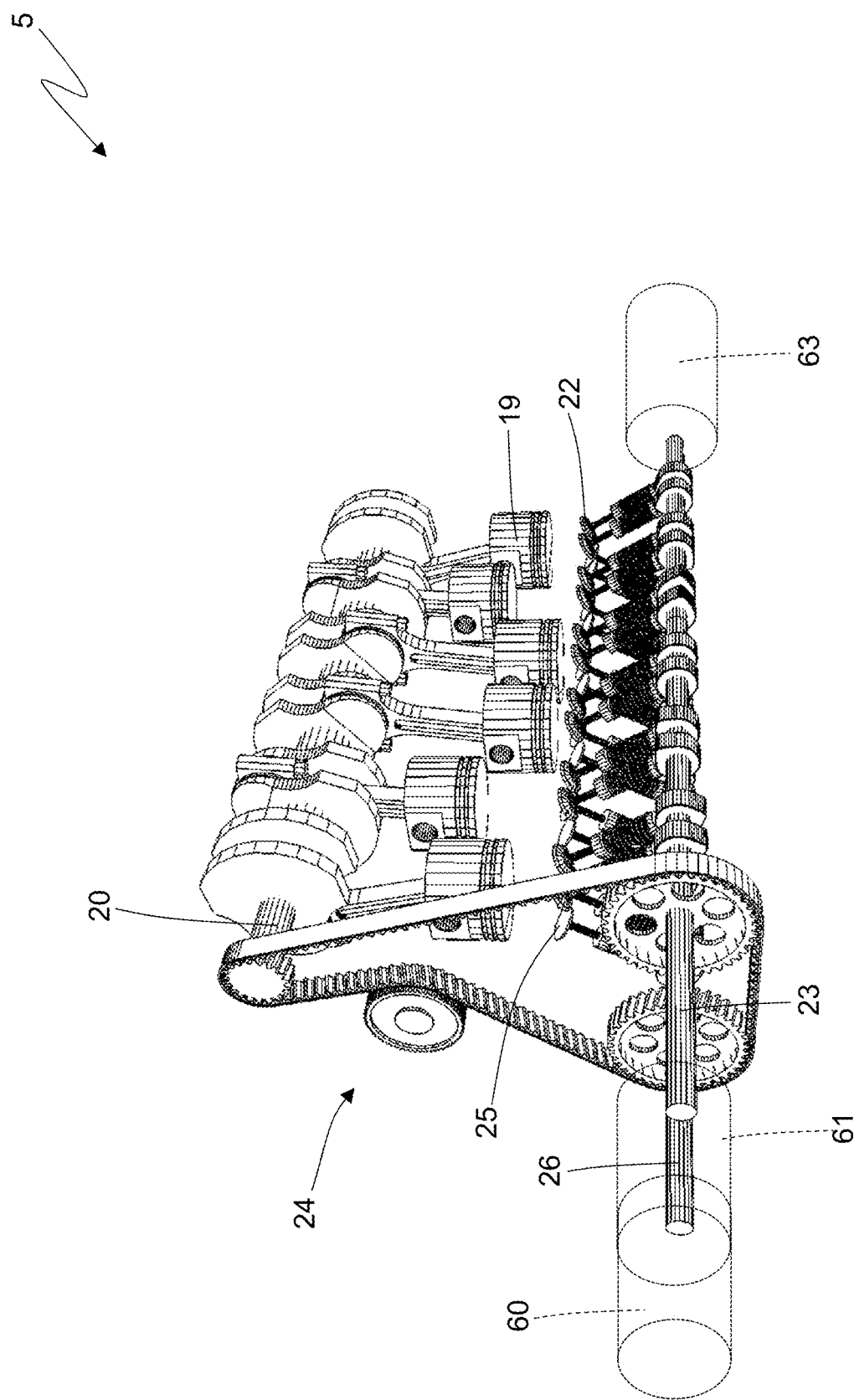
FIGS. 27 and 28 are a perspective view and a schematic view, respectively, of two camshafts of the internal combustion engine, highlighting the arrangement of lubrication pumps and of a cooling pump.

According to FIGS. 27 and 28, the camshaft 23 axially projects out of the cylinder head 21 on both sides: one lubrication pump 61 is arranged coaxial to the camshaft 23 and is directly connected to the camshaft 23 so as to be caused to rotate by the camshaft 23 and, similarly, the cooling pump 63 is arranged coaxial to the camshaft 23 on the side opposite the lubrication pump 61 and is directly connected to the camshaft 23 so as to be caused to rotate by the camshaft 23.

According to FIGS. 27 and 28, the camshaft 26 axially projects out of the cylinder head 21 on both sides: the other lubrication pump 61 (which is different from the lubrication pump 61 connected to the camshaft 23) is arranged coaxial to the camshaft 26 and is directly connected to the camshaft 26 so as to be caused to rotate by the camshaft 26 and, similarly, the lubrication pump 60 is arranged coaxial to the camshaft 26 on the side opposite the lubrication pump 61 and is directly connected to the camshaft 26 so as to be caused to rotate by the camshaft 26.

In this way, all four pumps 60, 61 and 63 are coaxial to the respective camshafts 23 and 26 and are directly caused to rotate by the respective camshafts 23 and 26.

According to other embodiments which are not shown herein, the number of pumps 60, 61 and 63 is different (smaller), since, for instance, there could be one single lubrication delivery pump 61; in this case, (at least) one camshaft 23 or 26 axially projects out of the cylinder head 21 only on one side.

According to other embodiment which are not shown herein, the arrangement of the pumps 60, 61 and 63 could be different, namely it could change: for instance, the cooling pump 63 could be connected to the camshaft 26 or the lubrication pump 60 could be connected to the camshaft 23.

According to FIG. 15, the gearbox 7 is directly connected to the crankshaft 20 of the internal combustion engine 5, is aligned with the internal combustion engine 5 and is arranged behind the internal combustion engine 5. In particular, the gearbox 7 is vertically aligned with an upper part of the engine block of the internal combustion engine 5; namely, the gearbox 7 is vertically aligned with the upper part of the crankcase 17.

The gearbox 7 has a dual clutch and is interposed between the crankshaft 20 of the internal combustion engine and the rear drive wheels 4. The gearbox 7 comprises a drum 64, which is caused to rotate by the crankshaft 20, and two clutches 65, which are contained—next to one another—in the drum 64 in order to receive the motion from the drum 64. Furthermore, the gearbox 7 comprises two input shafts 66, which are coaxial to one another, are inserted inside one another and are each connected to a corresponding clutch 65 so as to receive the motion from the corresponding clutch 65. Each clutch 65 comprises driving discs, which are integral to the drum 64 (hence, always rotate together with the crankshaft 20, to which the drum 64 is constrained), and driven discs, which are alternated with the driving discs and are integral to the corresponding input shafts 66 (hence, always rotate together with the corresponding input shafts 66).

The drum 64 of the gearbox 7 with dual clutch 65 is arranged on the side opposite the internal combustion engine (namely, opposite the crankshaft 20) relative to the two input shafts 66; furthermore, the gearbox 7 with dual clutch 65 comprises a transmission shaft 67, which connects the crankshaft 20 to the drum 64, is coaxial to the two input shafts 66 and is inserted inside the two input shafts 66. In other words, the transmission shaft 67 ends in the area of an end wall of the drum 64 and is constrained to the end wall of the drum 64. In particular, a first input shaft 66 is arranged on the outside, the transmission shaft 67 is arranged on the inside and the other (second) input shaft 66 is arranged between the transmission shaft 67 and the first input shaft 66. In other words, from the inside outwards, there are the transmission shaft 67 (which is at the centre) and, one after the other, the two input shafts 66 (which are inserted inside one another and both surround the transmission shaft 67).

According to a preferred embodiment shown in the accompanying figures, the input shafts 66 and the transmission shaft 67 of the gearbox 7 are coaxial to the crankshaft 20 of the internal combustion engine 5; namely, the internal combustion engine 5 is aligned with the gearbox 7.

The gearbox 7 with dual clutch 65 comprises one single output shaft 68 connected to the differential 8 that transmits the motion to the rear drive wheels 4; according to an alternative and equivalent embodiment, the dual-clutch gearbox 7 comprises two output shafts 68, both connected to the differential 8. A pair of axle shafts 69 start from the differential 8, each integral to a rear drive wheel 4.

The gearbox 7 has seven forward gears indicated with Roman numerals (first gear I, second gear II, third gear III, fourth gear IV, fifth gear V, sixth gear VI and seventh gear VII) and a reverse gear (indicated with R). Each input shaft 66 and the output shaft 68 are mechanically coupled to one another by a plurality of gear trains, each defining a respective gear and comprising an input gear wheel 70 fitted on the input shaft 66 and an output gear wheel 71 fitted on the output shaft 68. In order to allow for a correct operation of the gearbox 7, all odd gears (first gear I, third gear III, fifth gear V, seventh gear VII) are coupled to a same input shaft 66, whereas all even gears (second gear II, fourth gear IV and sixth gear VI) are coupled to the other input shaft 66.

Each input gear wheel 70 is splined to a respective input shaft 66, so as to always rotate with the input shaft 66 in an integral manner, and permanently meshes with the respective output gear wheel 71; on the other hand, each output gear wheel 71 is mounted on the output shaft 68 in an idle manner. Furthermore, the gearbox 7 comprises four synchronizers 72, each of which is mounted coaxial to the output shaft 68, is arranged between two output gear wheels 19 and is designed to be operated so as to alternatively fit the two respective output gear wheels 19 to the output shaft 68 (i.e. so as to alternatively cause the two respective output gear wheels 19 to become angularly integral to the output shaft 68). In other words, each synchronizer 72 can be moved in one direction to fit an output gear wheel 71 to the output shaft 68 or can be moved in the other direction to fit the other output gear wheel 71 to the output shaft 68.

Figure 13:
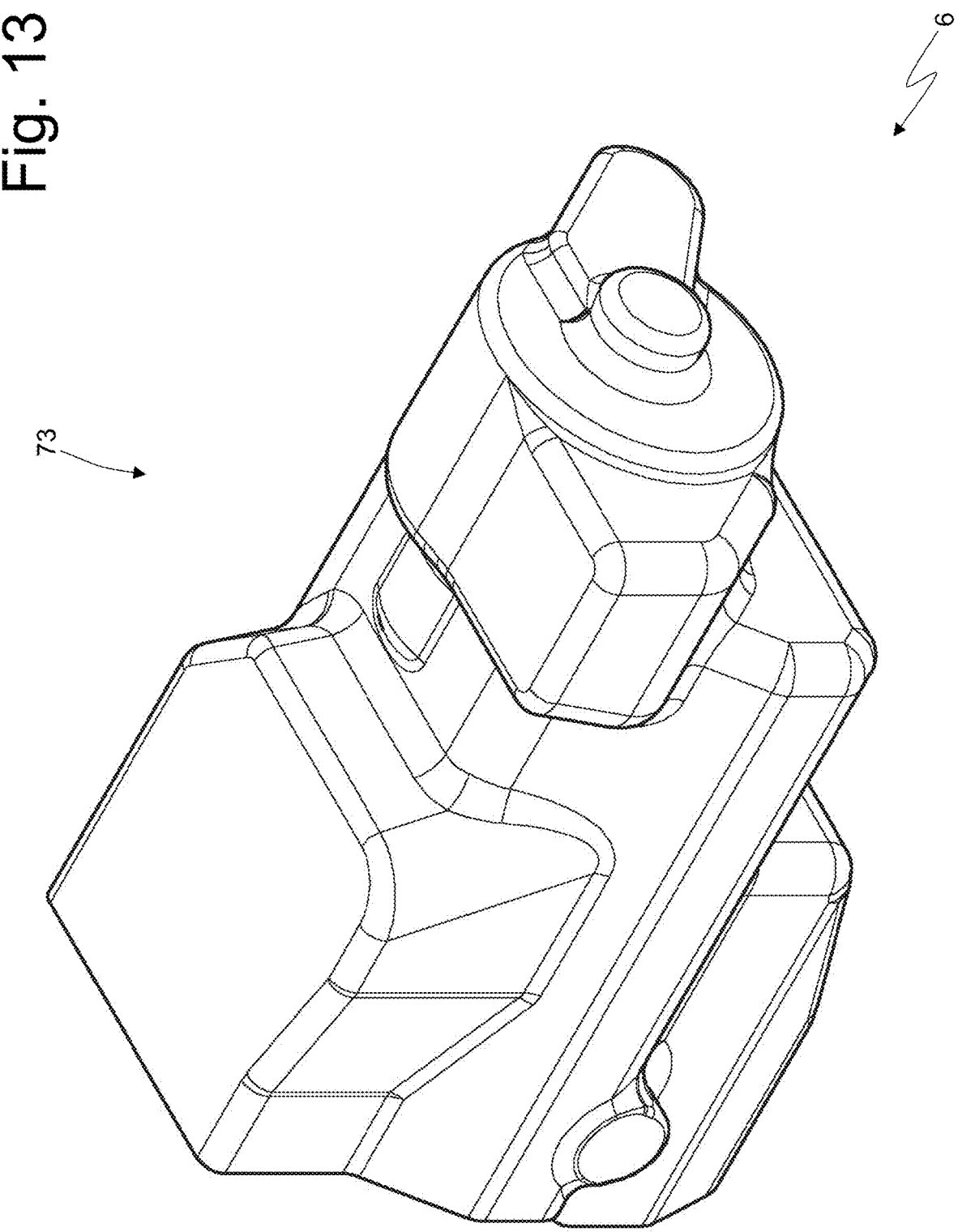
FIGS. 13 and 14 are a perspective view and a side view, respectively, of a drivetrain system of the car of FIG. 1.
Figure 14:
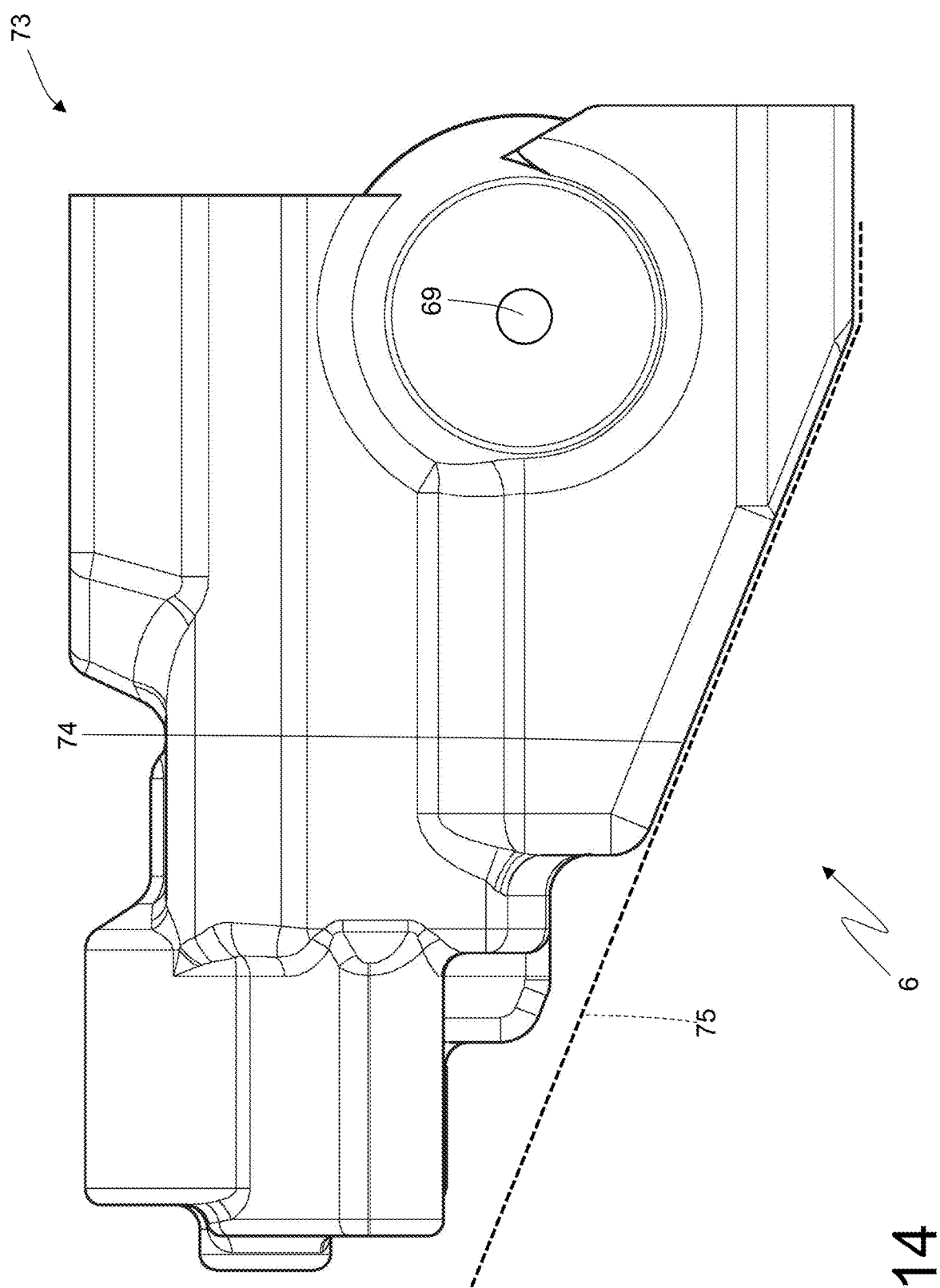

According to FIGS. 13 and 14, the car 1 comprises a containing body 73, which (also) contains, on the inside, the dual-clutch gearbox 7 and has a tapered shape towards the rear, so that the height of the containing body 73 progressively decreases from the front to the rear. Namely, a front wall of the containing body 73 is higher than a rear wall of the containing body 73. In particular, the containing body 73 has, at the bottom, a bottom wall 74, which is inclined relative to the horizontal because of the tapered shape of the containing body 73.

The differential 8 (which receives the motion from the output shaft 68 of the gearbox 7 and transmits the motion to the two rear drive wheels 4 by means of the two respective axle shafts 69) is arranged inside the containing body 73 in a front position and under the gearbox 7. The two axle shafts 69 laterally project out of the containing body 73.

Owing to the above, the gearbox 7 is directly connected to the crankshaft 20 of the internal combustion engine 5, is aligned with the internal combustion engine 5 (namely, the input shafts 66 and the transmission shaft 67 of the gearbox 7 are coaxial to the crankshaft 20 of the internal combustion engine 5) and is arranged behind the internal combustion engine 5; furthermore, the intercooler 39 is horizontally arranged above the gearbox 7 (namely, above the containing body 37 where the gearbox 7 is located).

Figure 7:
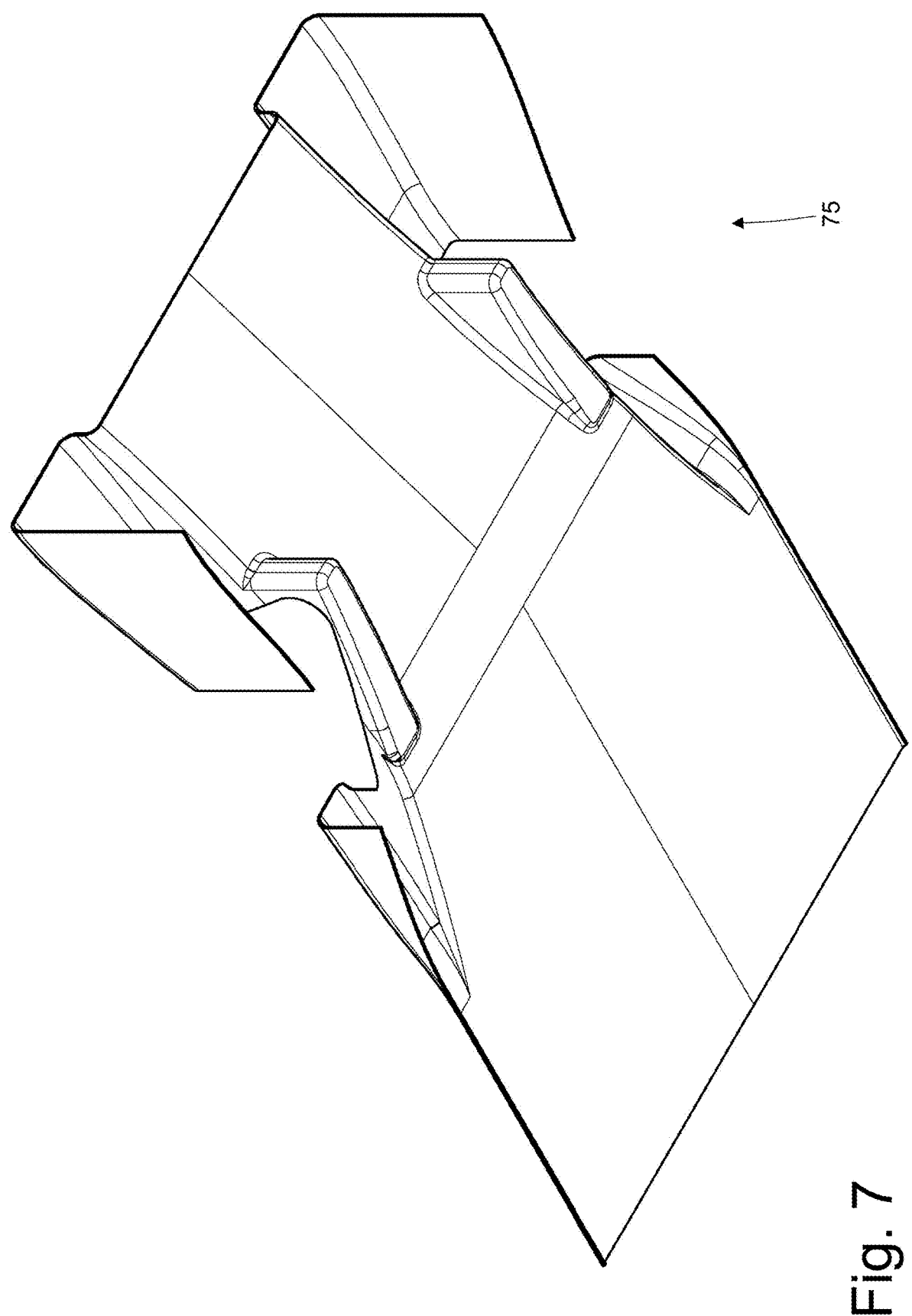
FIGS. 7 and 8 are a perspective view and a side view, respectively, of an aerodynamic diffuser of the car of FIG. 1.
Figure 8:
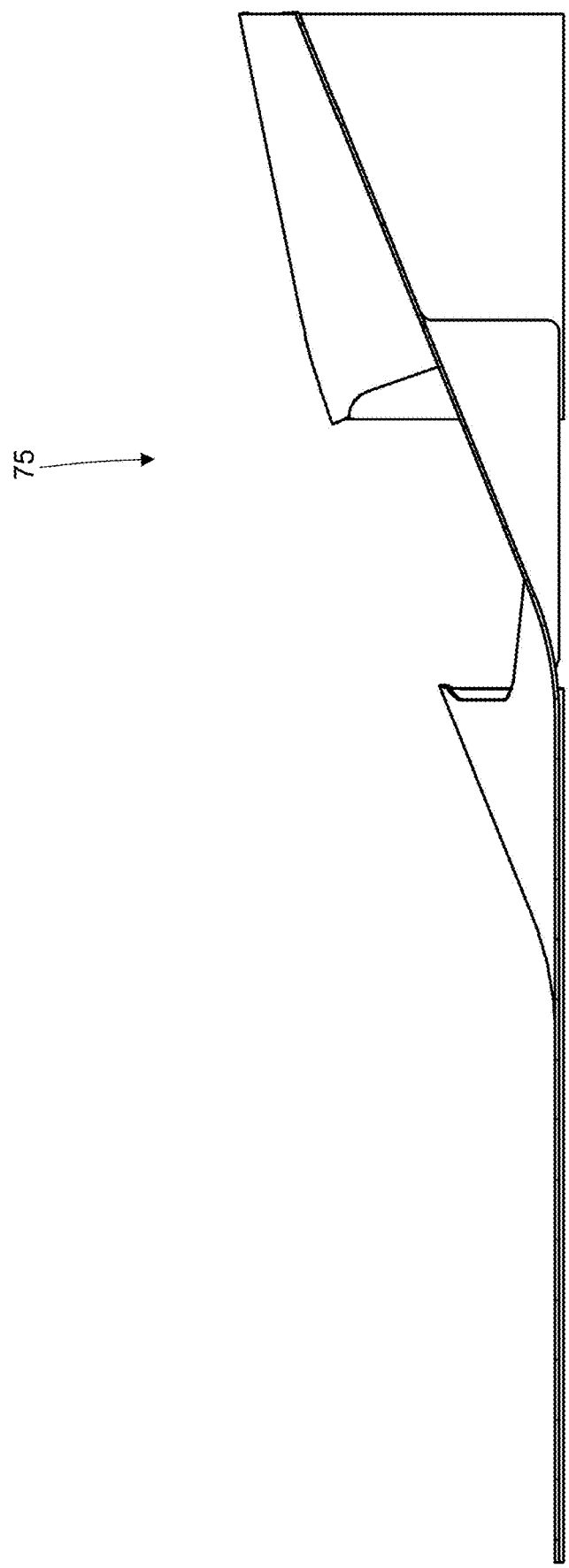
Figure 9:
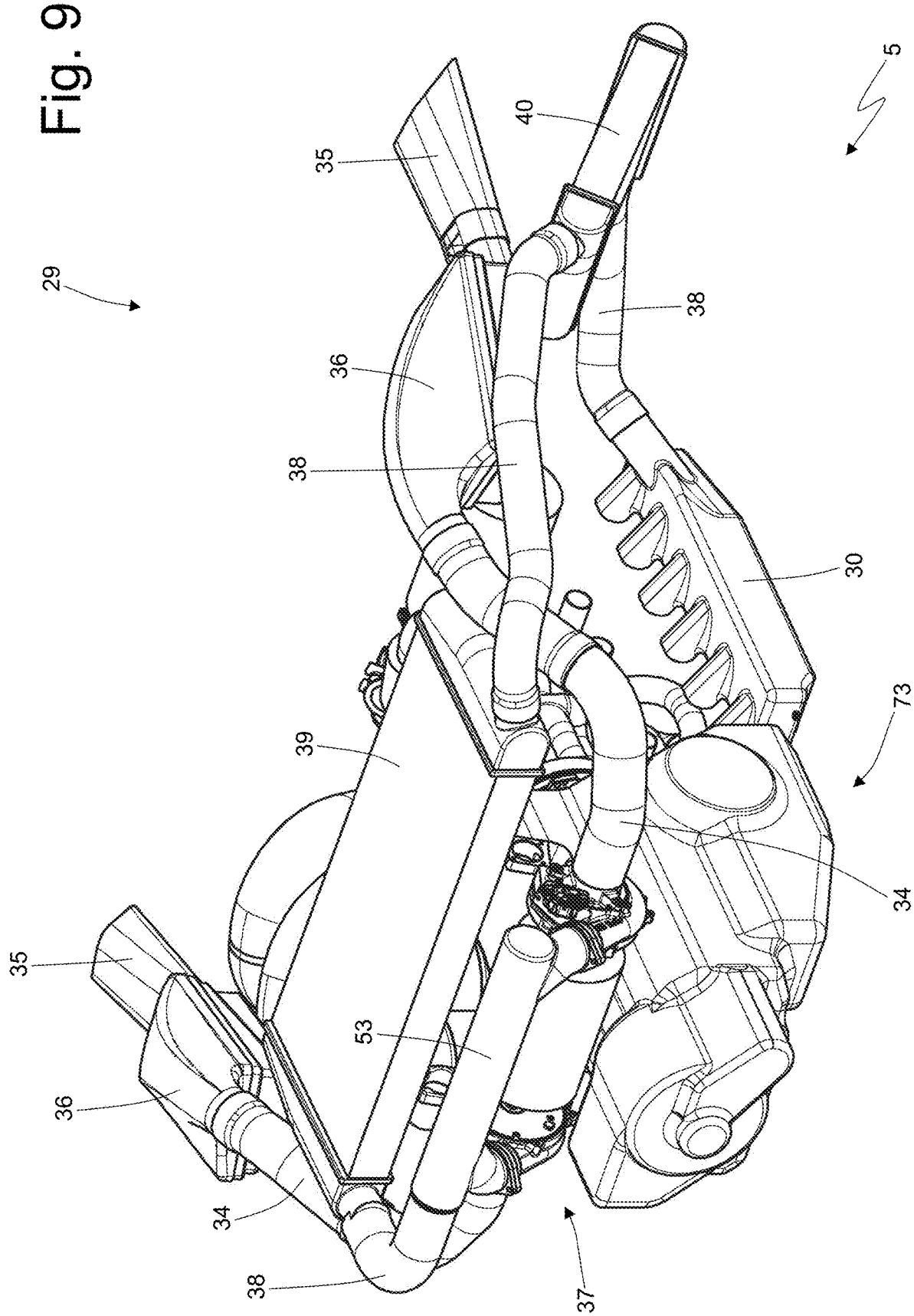
FIGS. 9-12 respectively are two different perspective views, namely a top view and a rear view, of the internal combustion engine.
Figure 10:
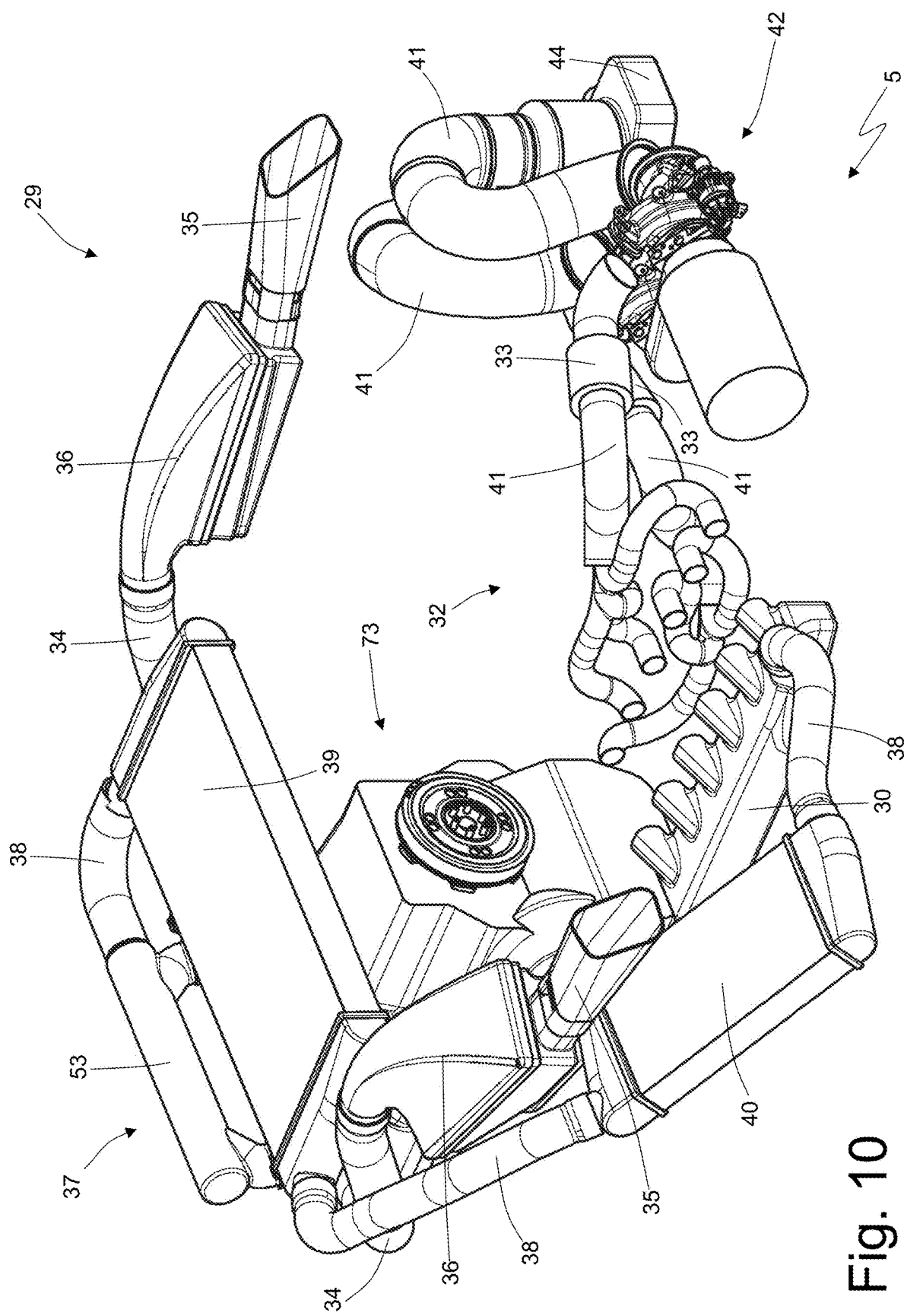

According to FIGS. 3, 7 and 8, the car 1 comprises a rear aerodynamic diffuser 75, which faces the road surface 14, starts in the area of a rear wall of the engine block (consisting of the crankcase 17 and of the cylinder head 21) of the internal combustion engine 5 and is arranged under the gearbox 7 (namely, under the containing body 73 where the gearbox 7 is located).

According to a preferred embodiment, the bottom wall 74 of the containing body 73 (where the gearbox 7 is located) has the same inclination as the rear aerodynamic diffuser 75; namely, the bottom wall 74 of the containing body 73 reproduces the shape of the rear aerodynamic diffuser 75, since it has the same inclination. In this way, the rear aerodynamic diffuser 75 takes on all the space available under the gearbox 7 (namely, under the containing body 73 where the gearbox 7 is located).

Figure 6:
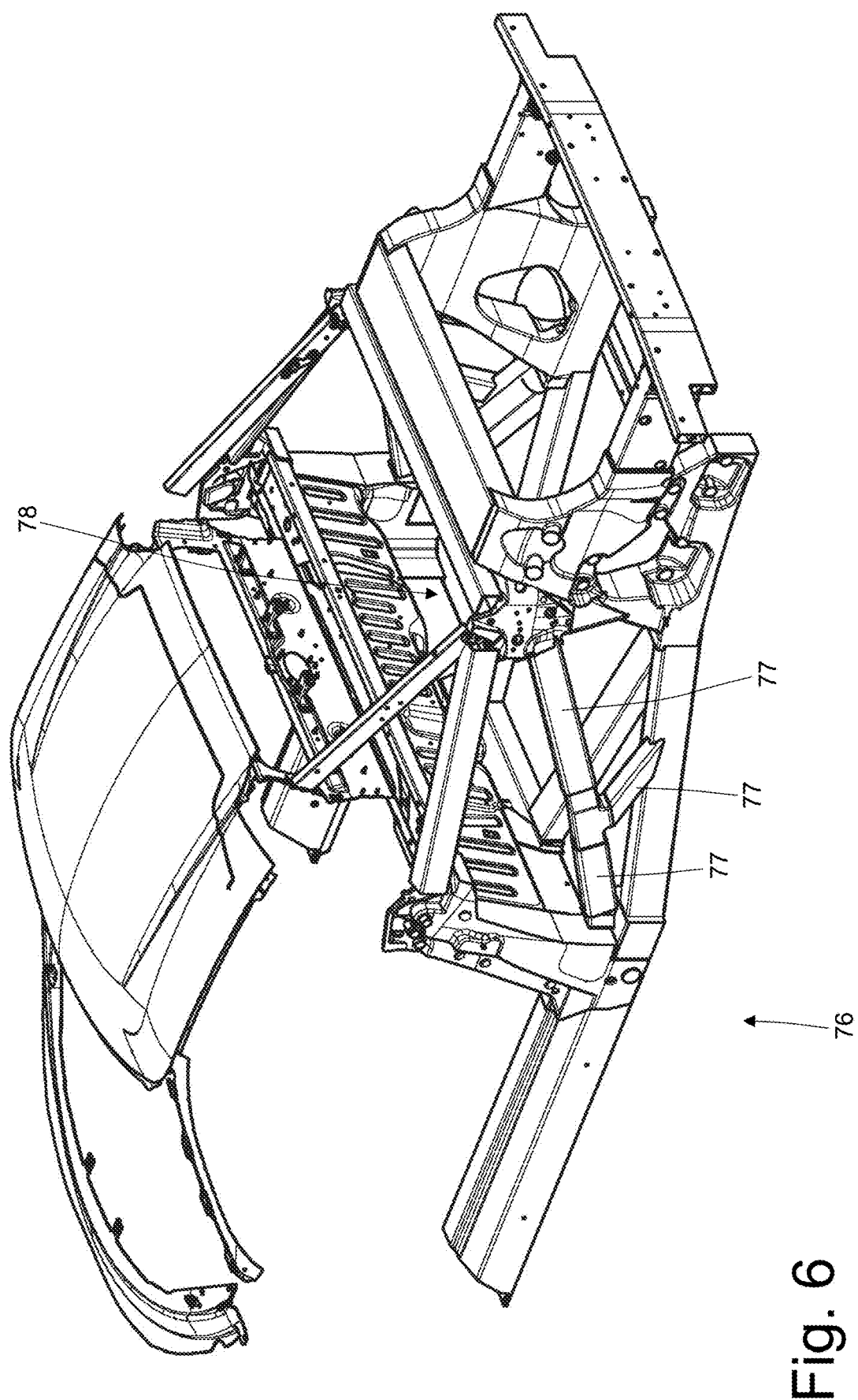
FIG. 6 is a perspective view, with parts removed for greater clarity, of a frame of the car of FIG. 1.

According to FIG. 6, the car 1 comprises a frame 76 (partially shown in FIG. 6). The rear part of the frame 76 comprises side bars 77, which are arranged in the area of the spherical tanks 15 in order to protect the spherical tanks 15 from side hits; the side bars 77 create tetrahedrons so as to be more hit-resistant.

According to FIG. 6, within the frame 76 there is obtained an engine compartment 78, where the internal combustion engine 5 is accommodated. According to FIG. 3, the bottom 14 of the car 1 comprises an opening 79, which is arranged in the area of the engine compartment 78, and a removable panel 80, which is fixed in a removable manner and closes the opening 79. The opening 79 has a shape that is similar to a size of the engine compartment 78; namely, the size of the opening 79 approximately is (as much as possible) the same as the size of the engine compartment 78, so that complete access to the engine compartment 78 is allowed through the opening 79.

According to a preferred embodiment, the removable panel 80 is at least partially transparent; in particular the removable panel 80 has, at the centre, a transparent window 81 (for example, made of glass). The function of the transparent window 81 basically is a technical function, since it allows operators to visually inspect the internal combustion engine 5 without having to remove the removable panel 80.

According to a preferred embodiment, the body 12 has no openable hood (arranged above the engine compartment 78) allowing access to the engine compartment 78; namely, the engine compartment 78 can only be accessed from the bottom through the opening 79, since the upper part of the engine compartment 78 is permanently closed by fixed, non-removable panels of the body 12.

According to a preferred embodiment, the removable panel 80 is directly fixed to the frame 76 by means of a plurality of screws 82 (preferably, quarter-turn screws 82)

The rear aerodynamic diffuser 75 faces the road surface 14, is arranged behind the removable panel 80 and borders the removable panel 80. Namely, the rear aerodynamic diffuser 75 starts where the removable panel 80 ends. The aerodynamic diffuser 75 is removable as well, so as to allow easier access to the containing body 73 of the gearbox 7.

In the embodiment shown in FIGS. 9-12, the turbine assembly 42 is provided so as to generate electrical power by means of the electric generator 54 and the compressor assembly 37 operates the two compressors 49 by means of the electric motor 50, which (at least partly) uses the electrical power generated by the electric generator 54 of the turbine assembly 42.

In the embodiment shown in FIGS. 18-21, there is no turbine assembly 42 and the compressor assembly 37 lacks the electric motor 50, since the two compressors 49 are operated by the gearbox 7 by receiving the motion from the drum 64 of the clutches 65 of the gearbox 7 (as better explained below). In other words, the two compressors 49 are operated by the transmission shaft 67 of the gearbox 7 (which directly causes the rotation of the drum 64 of the clutches 65 and is directly connected to the crankshaft 20). This embodiment is slightly less effective from an energetic point of view (since it does not recover part of the exhaust gas energy through the turbine assembly 42), but it is lighter, more compact and simpler, for the electric part is completely removed (as matter fact, the electric generator 54 of the turbine assembly 42 and the electric motor 50 of the compressor assembly 37 are no longer present).

According to FIGS. 22-26, there is an actuation system 83, which connects the drum 64 of the gearbox 7 to the compressor assembly 37 (namely, to the two compressors 49 of the compressor assembly 37) in order to get the motion from the drum 64 of the gearbox 7 so as to cause the rotation of the two compressors 49 of the compressor assembly 37. By way of example, the actuation system 83 increases the rotation speed so that the two compressors 49 of the compressor assembly 37 always rotate faster than the drum 64 of the gearbox 7; for instance, the two compressors 49 of the compressor assembly 37 could rotate 7-8 times faster than the drum 64 of the gearbox 7.

According to FIG. 15, the actuation system 83 is connected to an end wall of the drum 64 of the gearbox 7 on the side opposite the transmission shaft 67; namely, the drum 64 of the gearbox 7 has an end wall which, on one side, is connected to the transmission shaft 67 and, on the opposite side, is connected to the actuation system 83.

Figure 24:
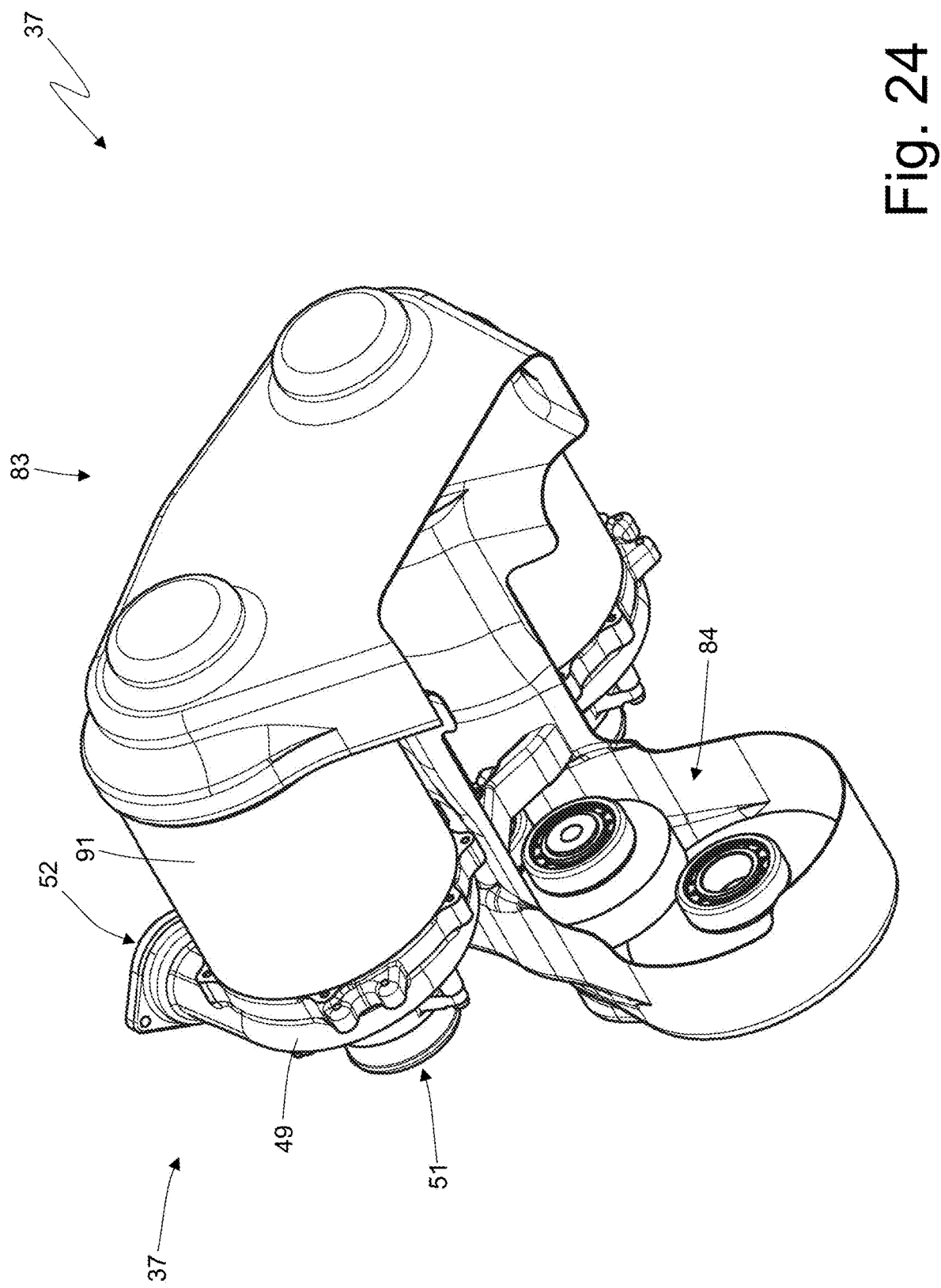
FIGS. 24 and 25 are two different perspective views of the compressor assembly of FIGS. 22 and 23 and of a corresponding actuation system.

According to a possible embodiment schematically shown in FIG. 24, the actuation system 83 comprises a varying device 84, which is interposed between the drum 64 of the gearbox 7 and the compressors 49 and has a variable gear ratio. The varying device 84 preferably has a centrifugal activation so as to autonomously change the gear ratio depending on the rotation speed of the drum 64 of the gearbox 7; in particular, the varying device 84 is configured to decrease the gear ratio as the rotation speed of the drum 64 of the gearbox 7 increases. Namely, when the rotation speed of the drum 64 of the gearbox 7 is lower, the gear ratio is higher and, hence, (given the same rotation speed of the drum 64) the compressors 49 rotate faster, whereas, when the rotation speed of the drum 64 of the gearbox 7 is higher, the gear ratio is lower and, hence, (given the same rotation speed of the drum 64) the compressors 49 rotate slower; in this way, the compressors 49 manage to generate an effective compression even when the drum 64 of the gearbox rotates slowly and without "over-revving" when the drum 64 of the gearbox rotates fast.

According to a preferred embodiment, the varying device 84 only has two different gear ratios; by way of example, the two gear ratios obtainable with the varying device 84 could differ from one another by 30-40%.

According to a preferred embodiment, the varying device 84 comprises a direct drive engaged by a centrifugal clutch and an epicyclic gearing creating a lower gear ratio from the direct drive: the centrifugal clutch is operated by the centrifugal force compressing the discs of the clutch, hence engaging the direct drive when the rotation speed of the drum 64 of the gearbox 7 exceeds a threshold value (thus, determining a reduction in the gear ratio when the rotation speed of the drum 64 of the gearbox 7 exceeds the threshold value). According to a preferred embodiment, a gear ratio of the varying device 84 could correspond to a direct drive (namely, a 1:1 gear ratio), whereas the other gear ratio could range from 1:1.3 to 1 1:1.4.

According to a preferred embodiment, the varying device 84 is connected to the drum 64 of the gearbox 7 on the side opposite the input shafts 66 and the transmission shaft 67.

In the embodiment shown in FIGS. 22-26, the two compressors 49 are parallel to and spaced apart from one another so as to rotate around two rotation axes 85, which are parallel to and spaced apart from one another and are parallel to a rotation axis 86 of the drum 64 of the gearbox 7 (which is coaxial to the input shafts 66, to the transmission shaft 67 and to the crankshaft 20). In particular, the rotation axis 86 of the drum 64 of the gearbox 7 is arranged between the rotation axes 85 of the compressors 49; namely, the two compressors 49 are arranged on the two opposite sides of the rotation axis 86 of the drum 64 of the gearbox 7.

Figure 26:
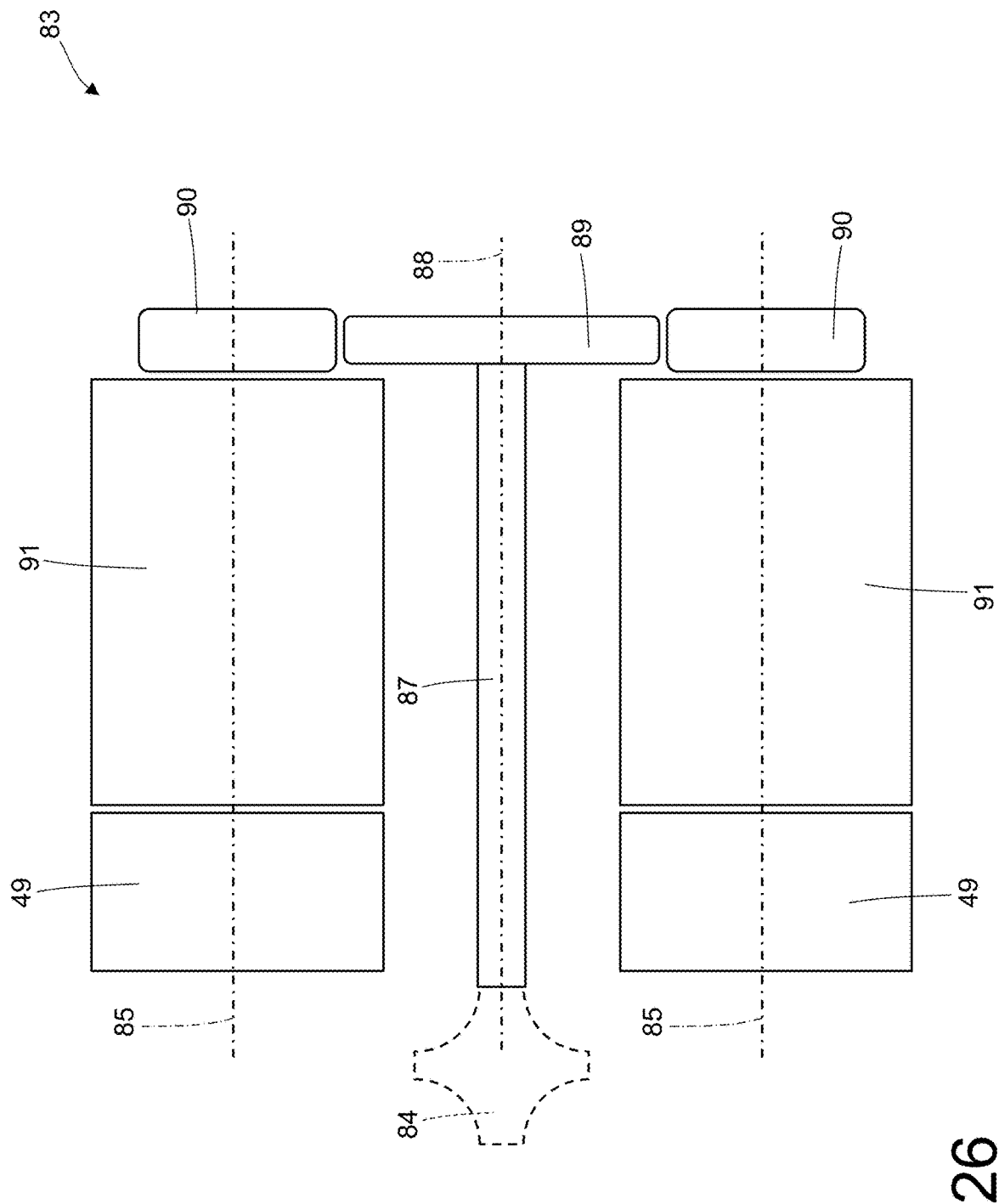
FIG. 26 is a schematic view of part of the actuation system of FIGS. 24 and 25.

According to a preferred embodiment shown in FIG. 26, the actuation system 83 comprises an intermediate shaft 87, which receives the motion from the drum 64 of the gearbox 7 and rotates around a rotation axis 88, which is parallel to and spaced apart from the rotation axis 86 of the drum 64 of the gearbox 7. In particular, between the drum 64 of the gearbox 7 and the intermediate shaft 87 there is interposed the varying device 84. The actuation system 83 comprises a central gear wheel 89, which receives the motion from the intermediate shaft 87 (namely, is constrained to the intermediate shaft 87), and two side gear wheels 90, which are arranged on the two sides of the central gear wheel 89, mesh with the central gear wheel 89 and each transmit the motion to a corresponding compressor 49 (namely, each side gear wheel 90 is constrained to a shaft of a corresponding compressor 49). Between each side gear wheel 90 and the corresponding compressor 49 there is interposed a transmission 91, which increases the rotation speed, so that the compressor 49 can rotate faster than the side gear wheel 90.

As a whole, the compressors 49 rotate much faster than the crankshaft 20 (namely, than the drum 64 of the gearbox 7): the compressor 49 approximately rotate around ten times faster than the crankshaft 20 (namely, the compressors 49 can reach 100,000 revolutions/min, whereas the crankshaft 20 can reach 10,000 revolutions/min).

Figure 22:
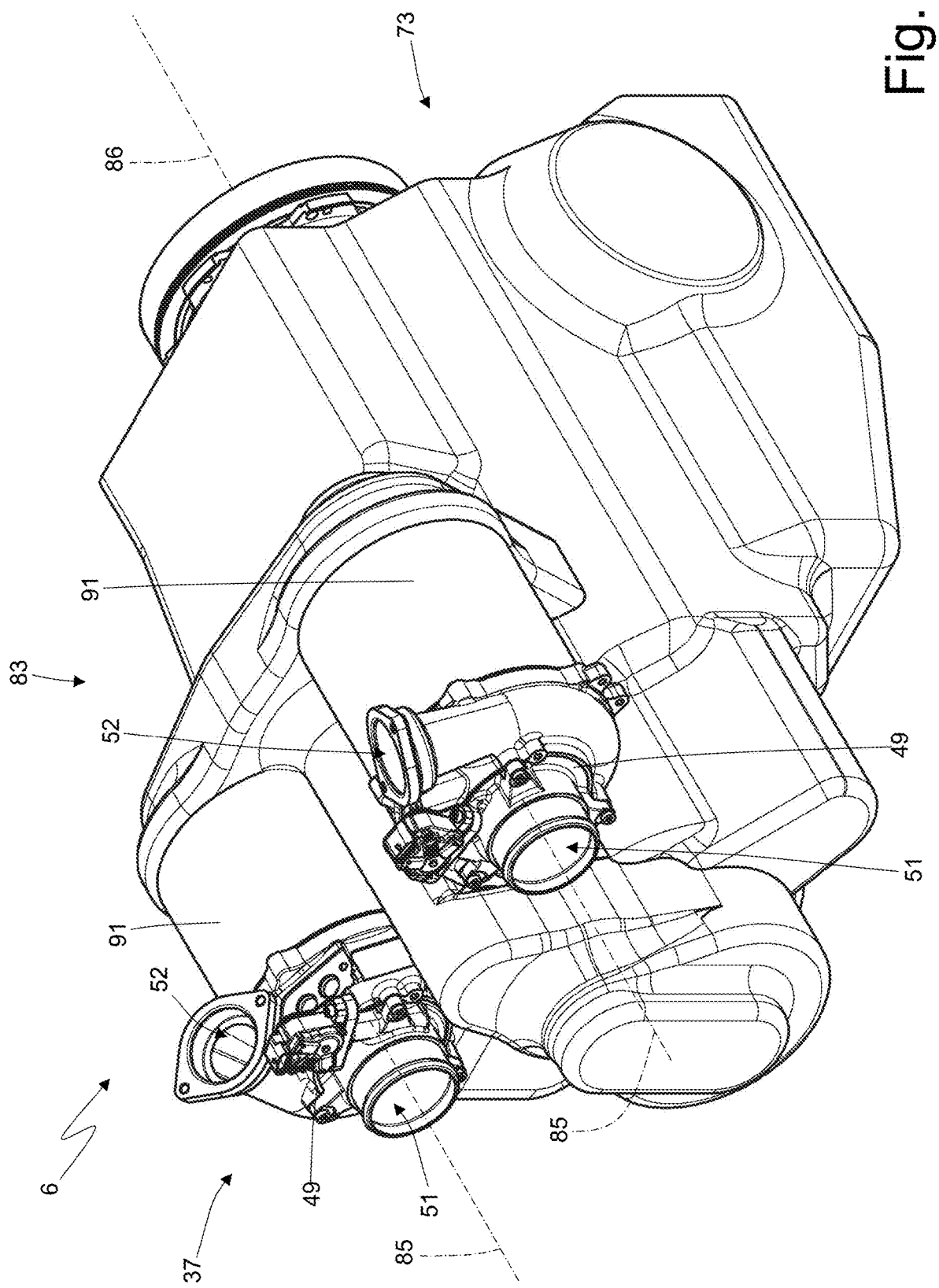
FIGS. 22 and 23 are a perspective view and a rear view, respectively, of a drivetrain system and of a compressor assembly coupled to the internal combustion engine of FIGS. 18-21.
Figure 23:
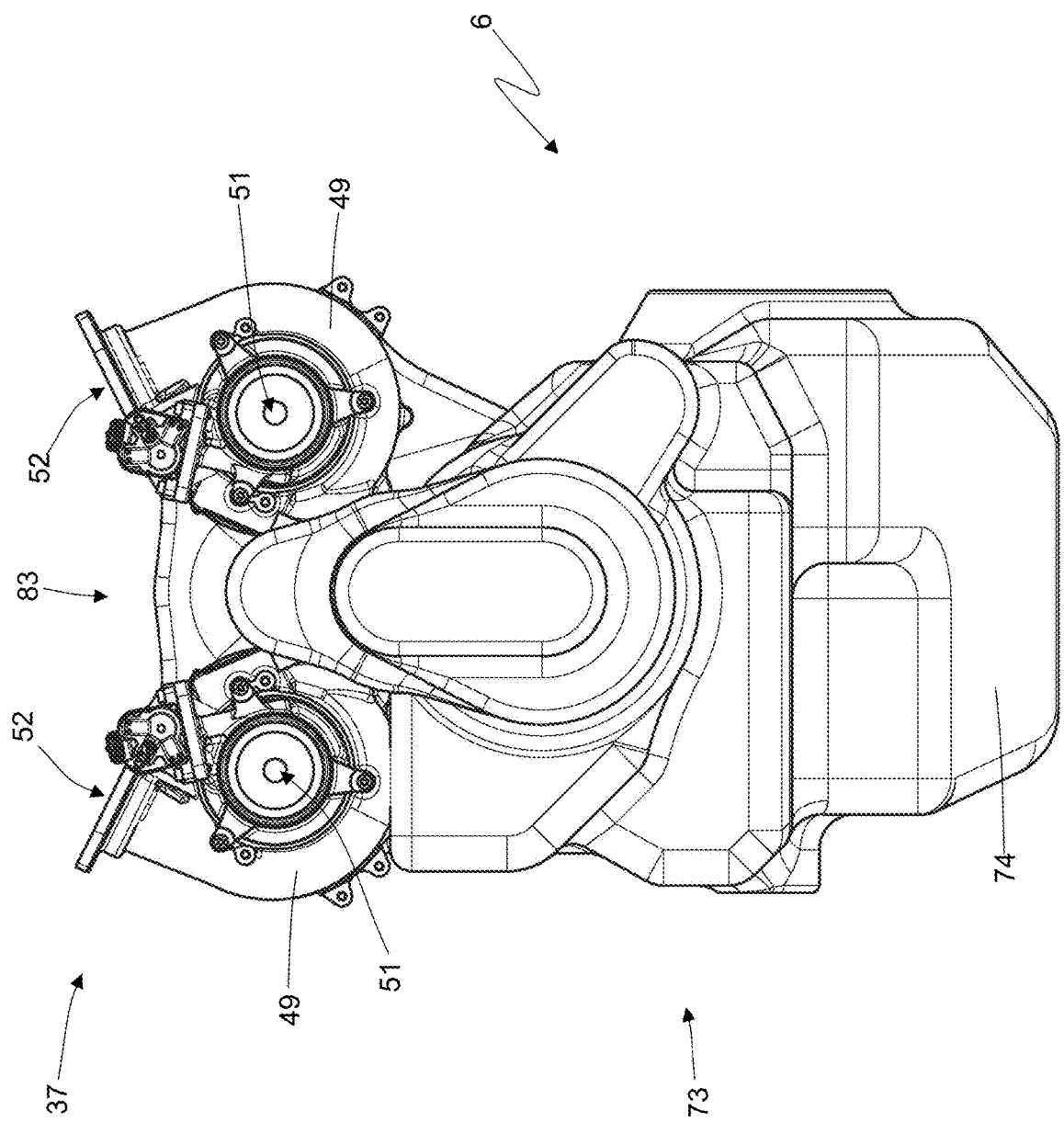
Figure 25:
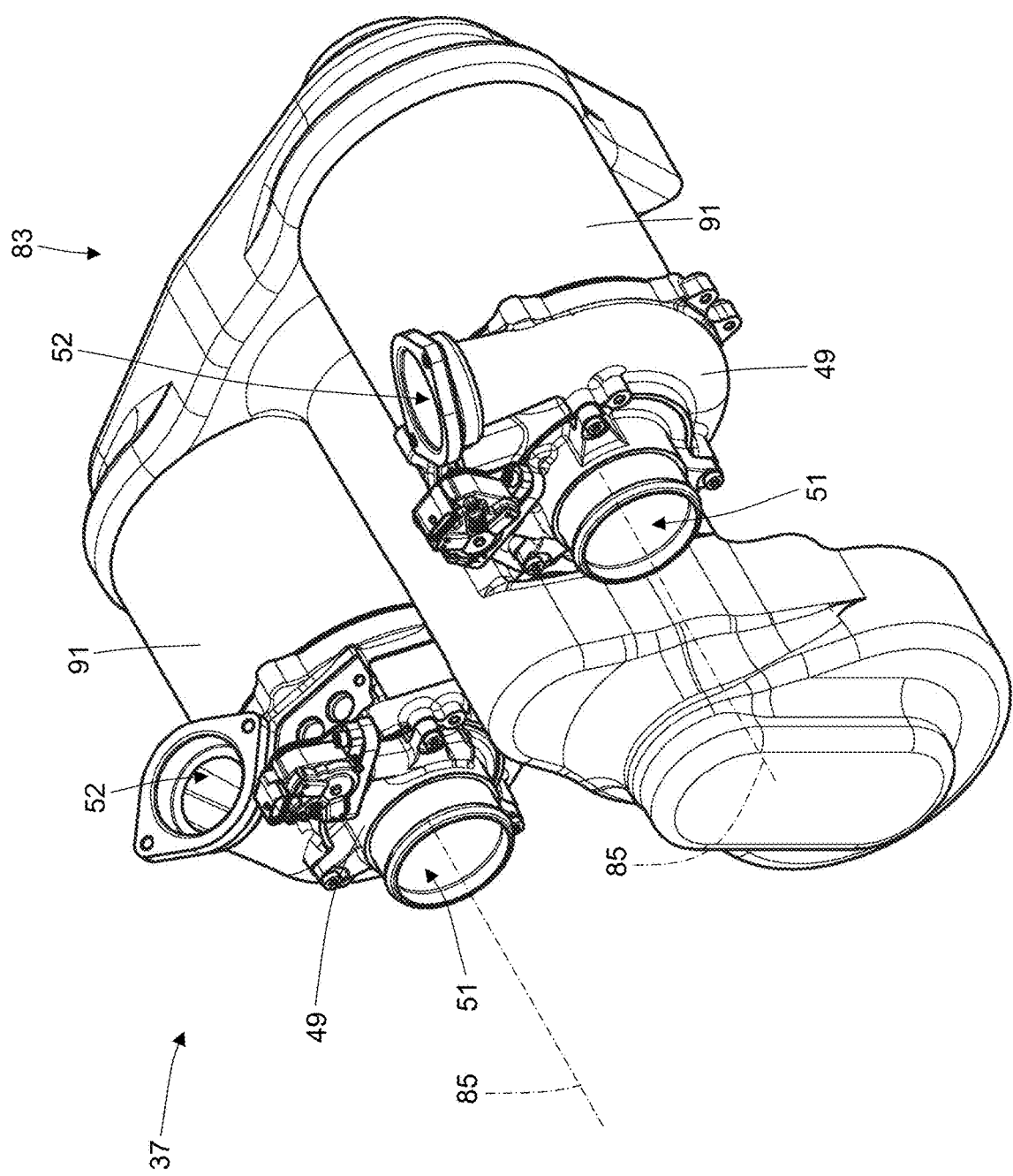

According to FIGS. 22 and 25, each compressor 49 comprises an axial inlet 51 arranged on the side opposite the actuation system 83 and a radial outlet 52. As mentioned above, the joining duct 53 (not shown in FIGS. 22-25) is provided, which is connected to both outlets 52 of the two compressors 49 so as to receive and join compressed air from both compressors 49.

In the embodiment shown in FIGS. 9-12 there are two exhaust ducts 41, which originate from the cylinders 18, end in the silencer 44 and are completely separate and independent from the cylinders 18 to the silencer 44. On the other hand, in the embodiment shown in FIGS. 18-21 there is an exhaust duct 92, to which both exhaust ducts 41 lead and which ends in the silencer 44; namely, the exhaust ducts 41 join one another upstream of the silencer 44, coming together in the exhaust duct 92, which leads into the silencer 44. In other words, the exhaust system 32 comprises one single exhaust duct 92, which receives exhaust gases from both exhaust ducts 41; namely, the two exhaust ducts 41 join one another so as to converge towards said single exhaust duct 92. The exhaust duct 92 starts at the confluence of the two exhaust ducts 41 and ends in the silencer 44.

In the embodiment shown in the accompanying figures, the compressor assembly 37 comprises two twin compressors 49; according to a different embodiment which is not shown herein, the compressor assembly 37 comprises one single compressor 49.

In the embodiment shown in the accompanying figures, the turbine assembly 42 (when present) comprises two twin turbines 43; according to a different embodiment which is not shown herein, the turbine assembly 42 (when present) comprises one single turbine 43.

The embodiments described herein can be combined with one another, without for this reason going beyond the scope of protection of the invention.

The car 1 described above has numerous advantages.

First of all, the car 1 disclosed above combines, at the same time, a large hydrogen storing capacity (hence, offering a satisfactory range) and very high dynamic performances thanks to a wheel base, an overall weight and a weight distribution that can be deemed ideal. These results are reached thanks to the particular shape and arrangement of the internal combustion engine 5 and of the drivetrain system 6, which create a large free space to accommodate the hydrogen tanks 9 and 10 without jeopardizing the dynamic performances of the car 1.

The car 1 disclosed above offers a rear aerodynamic chute (diffuser) with extremely large dimensions, thus allowing for the generation of a very large aerodynamic force without jeopardizing the drag.

In the car 1 disclosed above, it is possible to hear, inside the passenger compartment 15 (especially in the cockpit 16, where the driver sits), an exhaust noise that has both a sufficiently high intensity and a great sound quality; this result is obtained thanks to the fact that the outlet opening is located very close to the passenger compartment 15 and on the side of the cockpit 16, since this both "concentrates" the sound intensity close to the passenger compartment 15 and produces a very natural exhaust noise (namely, a noise that is not created or anyway modified in an artificial manner). Namely, the exhaust noise is not artificially "shot" towards the passenger compartment 15 through non-natural transmission channels, but, on the contrary, the exhaust noise reaches the passenger compartment 15 through the sole exhaust system, namely by following the natural way out for the exhaust noise.

In the car 1 disclosed above, also thanks to the particular conformation of the dual-clutch gearbox 7 where the drum 64 is arranged on the side opposite the internal combustion engine, it is possible to obtain a particularly advantageous arrangement of all the elements of the powertrain system (namely, a compact, yet extremely functional one) so as to minimize the length of the wheel base (namely, the distance between the front axle and the rear axle).

In the car 1 disclosed above, also thanks to the particular conformation of the compressor assembly 37 where the two twin compressors 49 are coaxial on the opposite sides of the electric motor 50, it is possible to obtain a particularly advantageous arrangement of all the elements of the powertrain system (namely, a compact, yet extremely functional one); at the same time, the presence of two twin compressors 49 allows for the compression of particularly large air flows.

In the car 1 disclosed above, also thanks to the particular conformation of the turbine assembly 42 where the two twin turbines 42 are arranged side by side so as to operate a same common electric generator 54, it is possible to obtain a particularly advantageous arrangement of all the elements of the powertrain system (namely, a compact, yet extremely functional one); at the same time, the presence of two twin turbines 42 allows a large quantity of energy to be recovered from the exhaust gases.

In the car 1 disclosed above (in particular, in the embodiment shown in FIGS. 18-26), the geometry of the intake ducts 34 and 38 is ideal both in terms of dimensions and in terms of load losses, though without requiring an electric actuation of the compressor assembly 37; this result is obtained by directly getting the motion needed to cause the rotation of the two compressors 49 of the compressor assembly 37 from the drum 64 of the dual-clutch gearbox 7, which is located in a very advantageous position for the positioning of the compressor assembly 37.

In the car 1 disclosed above, the particular conformation and the particular position of the two intercoolers 39 and 40 maximize the effectiveness and the efficiency of the compressed air cooling, without too heavily affecting the positioning of all the other components of the internal combustion engine 5.

In the car 1 disclosed above, the aerodynamic diffuser 75 has a very large size (thus, generating a high aerodynamic force with a moderate increase in drag) even if the internal combustion engine 5 is located in a central/rear position (hence, leading to an ideal mass distribution between the front axle and the rear axle) and, at the same time, the wheel base is relatively short (namely, the car 1 has an extremely well-performing dynamic behaviour). This result is obtained by placing the internal combustion engine 5 with the crankshaft 20 arranged higher: in this way, the gearbox 7 is arranged higher as well, thus freeing, in the low part of the rear area of the car, the space needed to accommodate the aerodynamic diffuser 75, which is extremely large-sized.

In the car 1 disclosed above, all the areas of the internal combustion engine 5 can be accessed in an ideal and complete manner; this result is obtained thanks to the bottom access, which, after having lifted the car 1, allows operators to place themselves exactly under the component on which to work. Namely, the bottom access to the internal combustion engine 5 makes maintenance simple and easy, since operators are not limited by the shape of the car 1 and can easily move in all the areas of the internal combustion engine 5, since the car 1 is lifted.

In the car 1 disclosed above, the fact that the removable panel is at least partially transparent constitutes, besides an undoubted technical advantage, as explained above, an aesthetic innovation and also makes the removable panel an aesthetic element; it should be pointed out that, thanks to the large-sized aerodynamic diffuser 75, at least part of the internal combustion engine 5 can easily be seen through the transparent part of the removable panel without having to excessively bend.

In the car 1 disclosed above, the body 12 is particularly stiff and resistant thanks to the complete lack of an opening to access the engine compartment 78 (and normally closed by a hood). In this way, given the same stiffness, the overall mass of the body 12 can be reduced. Furthermore, the lack of an opening allowing access to the engine compartment 78 also makes the body 12 completely continuous (namely, without gaps), thus reducing the drag coefficient. The possibility of eliminating, through the body 12, an opening allowing access to the engine compartment 78 is due to the fact that the internal combustion engine 5 does not require any maintenance in the upper part (consisting of the crankcase 17) and, consequently, accessing the engine compartment 78 from the top is no longer necessary. Finally, all the main components of the internal combustion engine 5 are in the lower part of the engine compartment 78 and are easily accessible from the bottom 14 through the opening 79 closed by the removable panel 80.

In the car 1 disclosed above, the lubrication pumps 60 and 61 and the cooling pump 63 have an ideal positioning, which minimizes the number of components needed to cause the rotation of the pumps 60, 61 and 63 and, at the same time, reduces load losses in the lubrication circuit 59 and in the cooling circuit 62. Namely, the fact that the four pumps 60, 61 and 63 are brought together and are simultaneously operated by means of the two camshafts 23 and 26 makes the solution more economic, light and compact compared to currently known solutions.

LIST OF THE REFERENCE NUMBERS OF THE FIGURES

1 car
2 front wheels
3 electric machine
4 rear wheels
5 internal combustion engine
6 drivetrain system
7 gearbox
8 rear differential
9 passenger compartment
10 cockpit
11 steering wheel
12 body
13 doors
14 bottom
15 tank
16 tank
17 crankcase
18 cylinders
19 pistons
20 crankshaft
21 cylinder head
22 intake valves
23 camshaft
24 belt transmission
25 exhaust valves
26 camshaft
27 fuel injector
28 spark plug
29 intake system
30 intake manifold
31 throttle valve
32 exhaust system
33 treatment device
34 intake ducts
35 air intakes
36 air filter
37 compressor assembly
38 intake duct
39 intercooler
40 intercooler
41 exhaust ducts
42 turbine assembly
43 turbine
44 silencer
45 end pipe
46 outlet opening
47 shaft 48 rotation axis
49 compressor
50 electric motor
51 axial inlet
52 radial outlet
53 joining duct
54 electric generator
55 rotation axes
56 transmission device
57 radial inlet
58 axial outlet
59 lubrication circuit
60 lubrication pump
61 lubrication pump
62 cooling circuit
63 cooling pump
64 drum
65 clutches
66 input shafts
67 transmission shaft
68 output shaft
69 axle shafts
70 input gear wheel
71 output gear wheel
72 synchronizers
73 containing body
74 bottom wall
75 aerodynamic diffuser
76 frame
77 side bars
78 engine compartment
79 opening
80 removable panel
81 transparent window
82 screws
83 actuation system
84 varying device
85 rotation axes
86 rotation axis
87 intermediate shaft
88 rotation axis
89 central gear wheel
90 side gear wheels
91 transmission
92 exhaust duct

The invention claimed is:

1. A car (1) comprising:
two front wheels (2);
two rear wheels (4);
an internal combustion engine (5), which is provided with a plurality of cylinders (18), where respective pistons (19) slide on the inside, and with a crankshaft (20) connected to the pistons (19);
a car body (12);
an engine compartment (78), where the internal combustion engine (5) is arranged; and
a bottom (14), which is the lowest part of the car (1) and, in use, faces a road surface on which the car (1) moves;
wherein the body (12) has no openable hood allowing access to the engine compartment (78);
wherein the bottom (14) comprises an opening (79), which is arranged in the area of the engine compartment (78), and a removable panel (80), which is fixed in a removable manner and closes the opening (79).

2. The car (1) according to claim 1, wherein the body (12) has no hood arranged above the engine compartment (78).

3. The car (1) according to claim 1, wherein the opening (79) has a size that is similar to a size of the engine compartment (78).

4. The car (1) according to claim 1, wherein the removable panel (80) is at least partially transparent.

5. The car (1) according to claim 1, wherein the removable panel (80) has, at the centre, a transparent window (81).

6. The car (1) according to claim 1 and comprising a frame (76), to which the removable panel (80) is directly fixed.

7. The car (1) according to claim 1, wherein the removable panel (80) is fixed by means of a plurality of screws (82).

8. The car (1) according to claim 1 and comprising a rear aerodynamic diffuser (75), which faces the road surface (14), is arranged behind the removable panel (80) and borders the removable panel (80).

9. The car (1) according to claim 1, wherein the internal combustion engine (5) is vertically oriented with the crankshaft (20) arranged higher than the cylinders (18).

10. The car (1) according to claim 9, wherein the internal combustion engine (5) comprises a crankcase (17), where the cylinders (18) are obtained, which are open downwards, and a cylinder head (21), which makes up the crown of the cylinders (18) and is arranged under the crankcase (17).

11. The car (1) according to claim 1, wherein the internal combustion engine (5) is longitudinally arranged.

12. The car (1) according to claim 1, wherein the internal combustion engine (5) is arranged in a central or rear position.

13. The car (1) according to claim 1, wherein, in the internal combustion engine (5), the cylinders (18) are arranged in line.

\* \* \* \* \*